United States Patent
Kikata et al.

(10) Patent No.: US 10,295,987 B2
(45) Date of Patent: May 21, 2019

(54) MACHINING PROGRAM EDITING ASSIST APPARATUS

(71) Applicant: Yamazaki Mazak Corporation, Niwa-gun (JP)

(72) Inventors: Kazuhiro Kikata, Niwa-gun (JP); Morikuni Kimura, Niwa-gun (JP); Takuro Katayama, Niwa-gun (JP); Shunsuke Koike, Niwa-gun (JP); Takayuki Ota, Niwa-gun (JP); Jun Matsui, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 16 days.

(21) Appl. No.: 15/441,152

(22) Filed: Feb. 23, 2017

(65) Prior Publication Data
US 2017/0160725 A1    Jun. 8, 2017

Related U.S. Application Data

(63) Continuation of application No. PCT/JP2015/075136, filed on Sep. 3, 2015.

(30) Foreign Application Priority Data

Sep. 3, 2014 (JP) ................................. 2014-179531

(51) Int. Cl.
*G05B 19/4068* (2006.01)
*B23Q 15/00* (2006.01)
(Continued)

(52) U.S. Cl.
CPC ....... *G05B 19/4068* (2013.01); *B23Q 1/0045* (2013.01); *B23Q 15/00* (2013.01);
(Continued)

(58) Field of Classification Search
CPC .............. G05B 19/4068; G05B 19/409; G05B 2219/23258; G05B 19/18;
(Continued)

(56) References Cited

U.S. PATENT DOCUMENTS

| 4,723,203 A | 2/1988 | Kishi et al. |
| 6,219,055 B1 * | 4/2001 | Bhargava ................ G06T 17/10 |
| | | 345/420 |

(Continued)

FOREIGN PATENT DOCUMENTS

| EP | 0935179 | 8/1999 |
| JP | 60-126710 | 7/1985 |

(Continued)

OTHER PUBLICATIONS

"CAx Implementor Forum : Test Suite for the CAx Implementor Forum Round 28J" Jul. 2011, 23 Pgs. By Boy et al (Year: 2011).*

(Continued)

*Primary Examiner* — Emilio J Saavedra
(74) *Attorney, Agent, or Firm* — Mori & Ward, LLP

(57) ABSTRACT

A machining program editing assist apparatus includes a display controller. When a specific portion on a shape display area is designated via an input device, the display controller allows a display candidate specified by the specific portion to be displayed as a designated display target of the shape display area, and allows at least one portion of data being among at least one display candidate of a program data display area and sectioned by a machining process constituting the at least one machining process and corresponding to the designated display target of the shape display area to be displayed as a designated display target of the program data display area on the program data display area in a state in which a beginning of the at least one portion of data is set to a display start position of the program data display area.

15 Claims, 29 Drawing Sheets

(51) Int. Cl.
*B23Q 17/00* (2006.01)
*G05B 19/18* (2006.01)
*G05B 19/409* (2006.01)
*B23Q 1/00* (2006.01)
*G09G 5/14* (2006.01)

(52) U.S. Cl.
CPC ............. *B23Q 17/00* (2013.01); *G05B 19/18* (2013.01); *G05B 19/409* (2013.01); *G05B 2219/23258* (2013.01); *G05B 2219/35292* (2013.01); *G05B 2219/36041* (2013.01); *G05B 2219/36043* (2013.01); *G09G 5/14* (2013.01); *G09G 2354/00* (2013.01)

(58) Field of Classification Search
CPC ........... G05B 2219/36043; G05B 2219/36041; B23Q 1/0045; B23Q 15/00; B23Q 17/00; G09G 5/14; G09G 2354/00
USPC .......................................................... 700/83
See application file for complete search history.

(56) References Cited

U.S. PATENT DOCUMENTS

| | | | | |
|---|---|---|---|---|
| 7,348,997 | B1* | 3/2008 | Croft | G06F 3/04815 345/629 |
| 2002/0031019 | A1* | 3/2002 | Nakamura | G05B 19/4068 365/200 |
| 2006/0038829 | A1* | 2/2006 | Morichi | G05B 19/4097 345/619 |
| 2014/0172151 | A1 | 6/2014 | Niwa et al. | |
| 2015/0248211 | A1* | 9/2015 | Johnson | G06F 3/04815 715/848 |

FOREIGN PATENT DOCUMENTS

| | | |
|---|---|---|
| JP | 03-094307 | 4/1991 |
| JP | 05-297925 | 11/1993 |
| JP | 06-202906 | 7/1994 |
| JP | 09-062326 | 3/1997 |
| JP | 11-065635 | 3/1999 |
| JP | 2013-186866 | 9/2013 |

OTHER PUBLICATIONS

International Preliminary Report on Patentability (Chapter I) with translation of Written Opinion of the International Searching Authority for corresponding International Application No. PCT/JP2015/075136, dated Mar. 16, 2017.
International Search Report for corresponding International Application No. PCT/JP2015/075136, dated Nov. 10, 2015.
Japanese Office Action for corresponding JP Application No. 2016-503869, dated May 10, 2016 (w/ English machine translation).
Extended European Search Report for corresponding EP Application No. 15838977.5-1927, dated Oct. 30, 2017.
European Office Action for corresponding EP Application No. 15838977.5-1205, dated Nov. 5, 2018.

* cited by examiner

POINT MACHINING UNIT/
C-AXIS POINT MACHINING UNIT
    ⌐ DRILL
    ⊢ WASHER FACED HOLE
    ⊢ TAP
    ⋮

LINE MACHINING UNIT/
C-AXIS LINE MACHINING UNIT
    ⌐ LINE CENTER
    ⊢
    ⋮

FACE MACHINING UNIT
    ⌐ FACE-MILL
    ⊢ END-MILL FACE
    ⋮

TURNING UNIT
    ⌐ BAR WORK
    ⊢
    ⋮

F I G. 5

| UNo. 0 | COMMON: UNIT DATA | | |
|---|---|---|---|
| UNo. 1 | FRM: UNIT DATA | | |
| UNo. 2 | HEAD SELECTION: UNIT DATA | | |
| UNo. 3 | INDEX: UNIT DATA | | |
| UNo. 4 | BAR WORK: UNIT DATA | TOOL SEQUENCE DATA (SNo.) | SHAPE SEQUENCE DATA (FIG) |
| UNo. 5 | INDEX: UNIT DATA | | |
| UNo. 6 | BAR WORK: UNIT DATA | TOOL SEQUENCE DATA (SNo.) | SHAPE SEQUENCE DATA (FIG) |
| UNo. 7 | INDEX: UNIT DATA | | |
| UNo. 8 | FRM SHIFT: UNIT DATA | | |
| UNo. 9 | FACING-MILL: UNIT DATA | TOOL SEQUENCE DATA (SNo.) | SHAPE SEQUENCE DATA (FIG) |
| UNo. 10 | DRILL: UNIT DATA | TOOL SEQUENCE DATA (SNo.) | SHAPE SEQUENCE DATA (FIG) |
| UNo. 11 | FRM SHIFT: UNIT DATA | | |
| ... | | | |
| File End | END: UNIT DATA | | |

| UNo. | UNIT | MACHINING PART | | | CUTTING-X | CUTTING-Z | | FINISHING ALLOWANCE-X | FINISHING ALLOWANCE-Z | | | |
|---|---|---|---|---|---|---|---|---|---|---|---|---|
| 4 | BAR WORK | OUTER DIAMETER | | NOMINAL | 120. | 0. | | 0.1 | 0.1 | | | |

| SNo. | TOOL | | | | No. | PATTERN | CUTTING 1 | CUTTING 2/ TIME | REMAINING CUTTING ALLOWANCE-3 | REMAINING ALLOWANCE-X | REMAINING ALLOWANCE-Z | SURFACE SPEED | FEED RATE | | | |
|---|---|---|---|---|---|---|---|---|---|---|---|---|---|---|---|---|
| R 1 | TURNING | OUTER DIAMETER | | 25. | A | 0 | 2 | @ | @ | @ | @ | 120 | 0.4 | M | M | M |
| F 2 | TURNING | OUTER DIAMETER | | 25. | A | @ | @ | @ | @ | 0. | 0. | 196 | 0.1 | | | |

| FIG PTN | FRONT CORNER | START-X | START-Z | START-X | START-Z | REAR CORNER/$ | R/θ | ROUGHNESS |
|---|---|---|---|---|---|---|---|---|
| 1 LINE | @ | @ | @ | 67. | 32.5 | @ | @ | |
| 2 LINES | | @ | @ | 100. | 85. | | @ | |
| 3 LINES | @ | @ | @ | 110. | 120. | | @ | |
| 4 TAPER | 110. | @ | 120. | 80. | 150. | | | |
| 5 LINES | @ | @ | @ | 80. | 350. | | | @ |

FIG. 10

| UNo. | UNIT | DEPTH | ALLOWANCE-Z | BOTTOM | FINISHING-ALLOWANCE-Z | | | | | | |
|---|---|---|---|---|---|---|---|---|---|---|---|
| 9 | FACING-MILL | 15. | 15. | 3 | 0. | | | | | | |

| SNo. | TOOL | NOMINAL DIAMETER | No. | APPROACH-X | APPROACH-Y | METHOD BIDIRECTIONAL CUT IN Y DIRECTION | ZFD | CUTTING-Z | CUTTING-R | SURFACE SPEED | FEED RATE |
|---|---|---|---|---|---|---|---|---|---|---|---|
| R 1 | FACING-MILL | 30. | A | 40. | 60. | | | 5. | 25. | 57 | 0.843 |

| FIG | PIN | X | Y | R/θ | I | J | P | | | CNR | RFEED | FEED M M M RATE | ROUGHNESS |
|---|---|---|---|---|---|---|---|---|---|---|---|---|---|
| 1 | STRAIGHT LINE | 50. | 40. | | | | | | | ◆ | ◆ | ▼ ▼ | 3 3 |
| 2 | STRAIGHT LINE | 0. | 40. | | | | | | | ◆ | ◆ | ▼ ▼ | 3 3 |
| 3 | STRAIGHT LINE | 0. | -40. | | | | | | | ◆ | ◆ | ▼ ▼ | 3 3 |
| 4 | STRAIGHT LINE | 50. | -40. | | | | | | | ◆ | ◆ | ▼ ▼ | 3 3 |

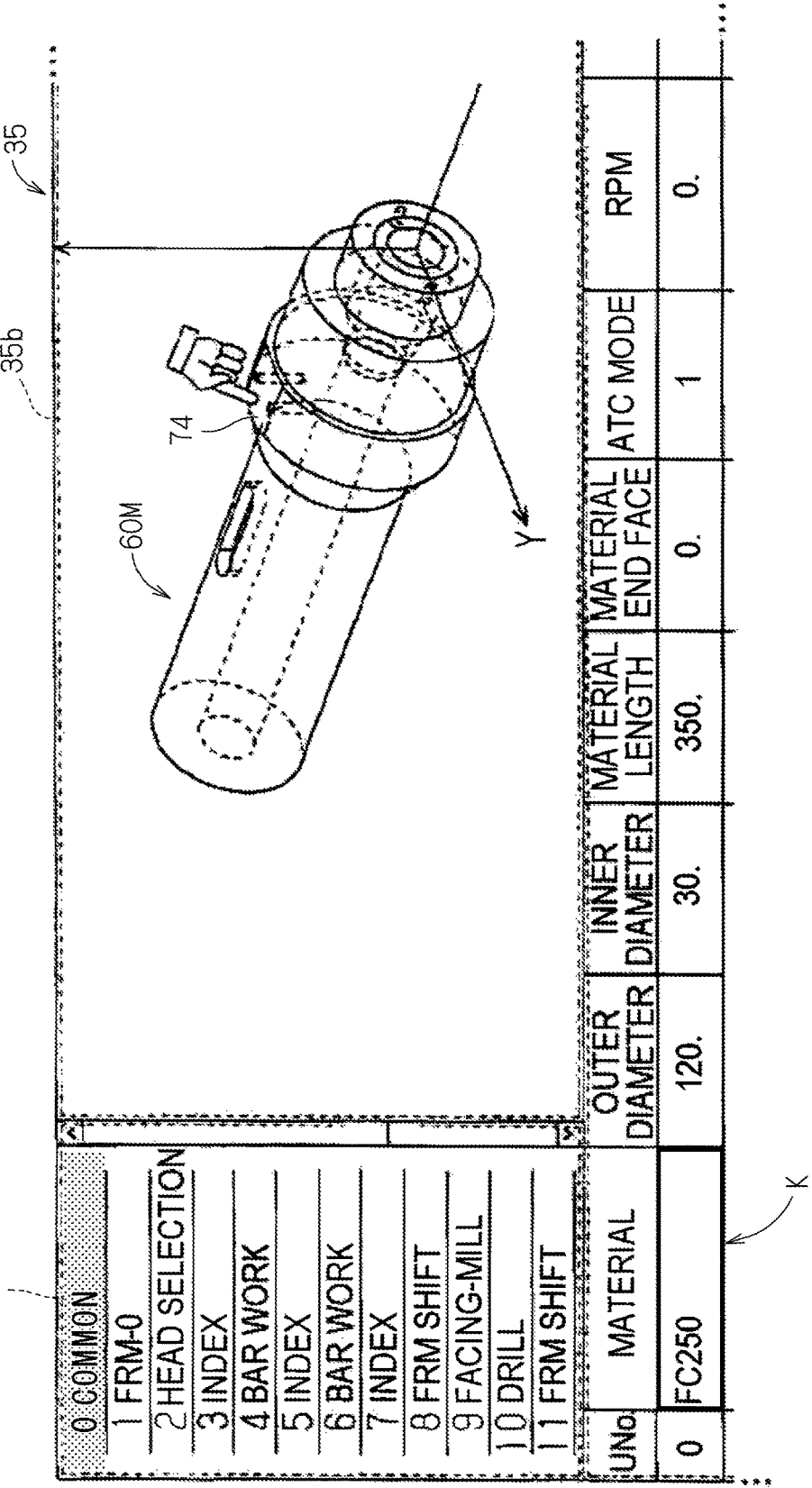

PROCESS INFORMATION TABLE

| No. | T CODE | ROW NUMBER |
|---|---|---|
| 1 | | |
| 2 | 1 | 4 |
| 3 | 3 | 6 |
| 4 | 7 | 32 |
| 5 | 15 | 33 |
| 6 | 27 | 322 |

FIG. 23

COORDINATE VALUE TABLE

| No. | PROGRAMM ROW NUMBER | G CODE | COORDINATE |
|---|---|---|---|
| | | | |
| | | | |
| | | | |
| ⋮ | ⋮ | ⋮ | ⋮ |

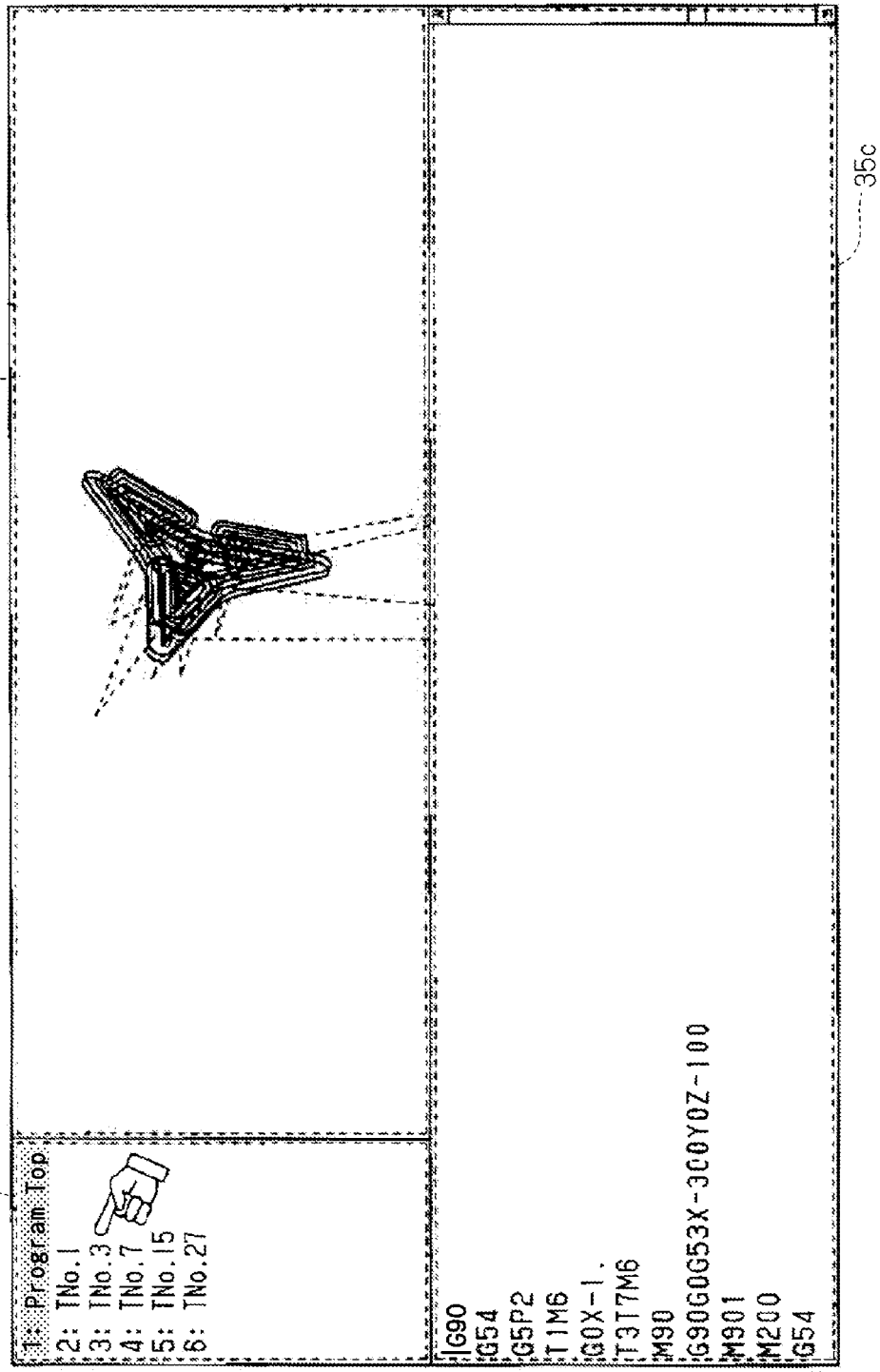

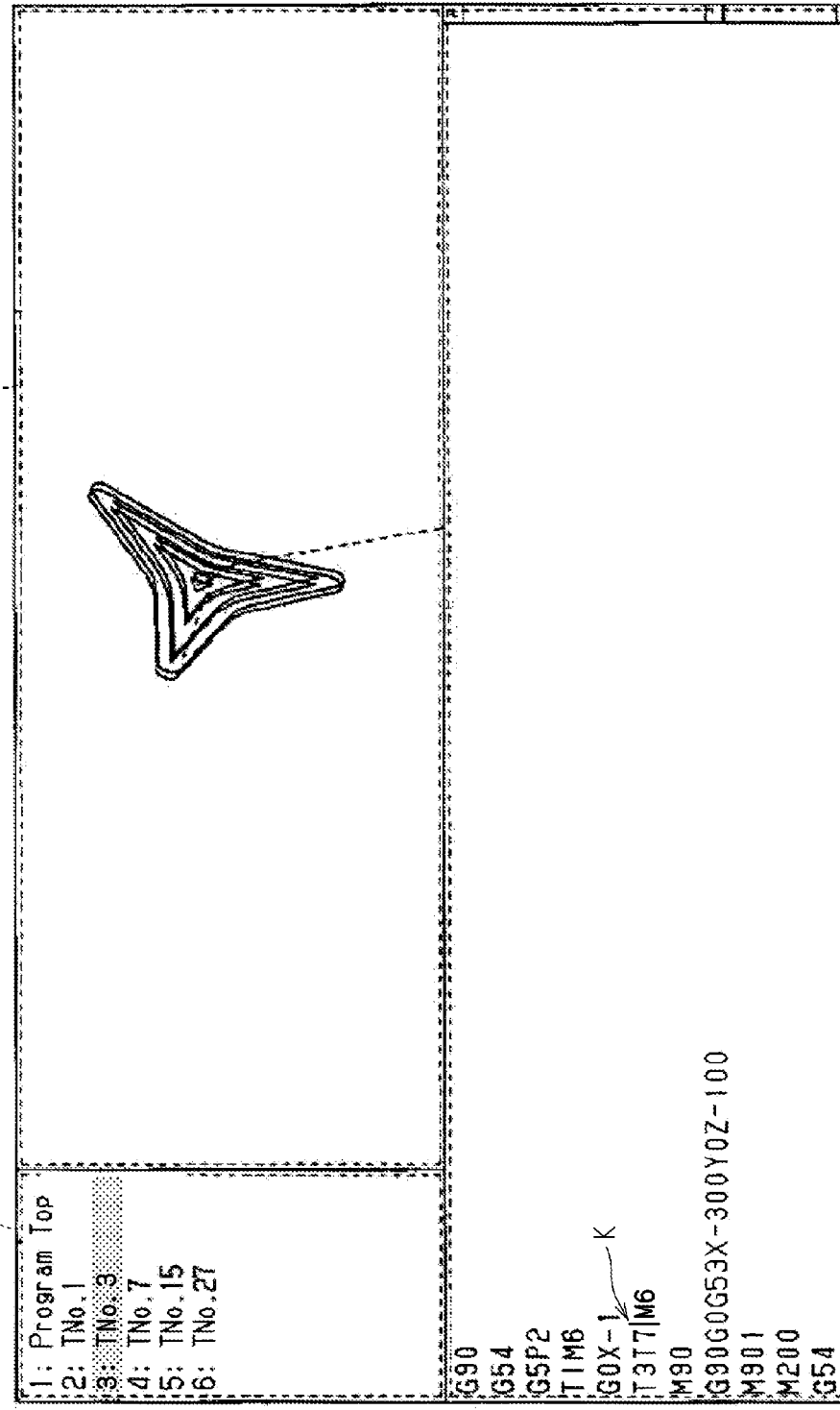

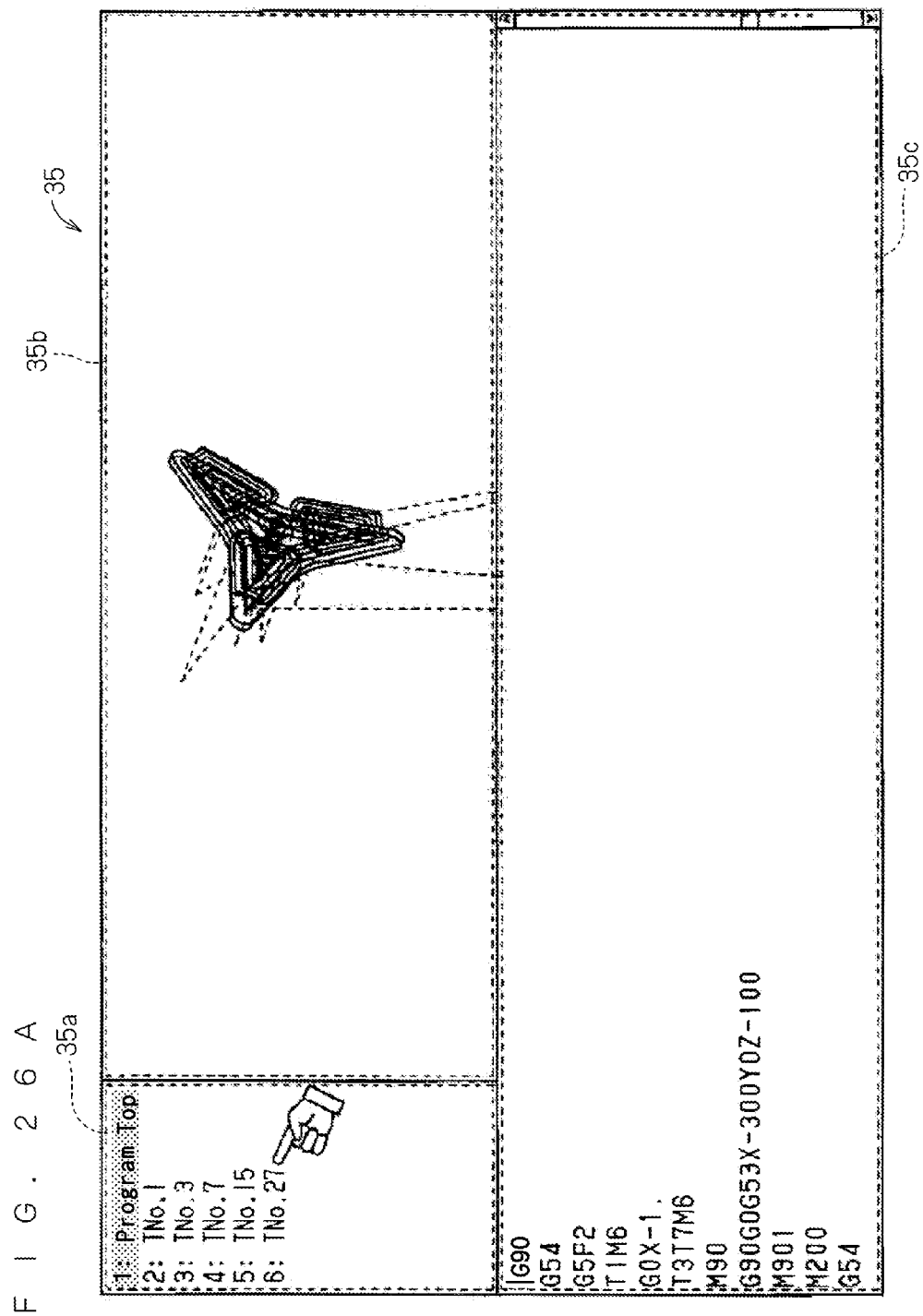

MACHINING PROGRAM EDITING ASSIST APPARATUS

CROSS-REFERENCE TO RELATED APPLICATIONS

The present application is a continuation application of International Application No. PCT/JP2015/075136, filed Sep. 3, 2015, which claims priority to Japanese Patent Application No. 2014-179531, filed Sep. 3, 2014, now Japanese Patent No. 5990662. The contents of these applications are incorporated herein by reference in their entirety.

BACKGROUND OF THE INVENTION

Field of the Invention

The present invention relates to a machining program editing assist apparatus.

Discussion of the Background

Japanese Unexamined Patent Publication No. H3-94307 discloses a device configured to analyze a machining program on a block-by-block basis, and graphically display a shape represented by analyzed data.

SUMMARY OF THE INVENTION

According to one aspect of the present invention, a machining program editing assist apparatus includes a display device, an input device to allow any point on a screen of the display device to be designated, a display controller configured to divide the screen into at least two display areas and control display on a program data display area and a shape display area among the display areas, and a machining program being for use in a machining tool and comprising program data that includes data sectioned for each of at least one machining process and that includes machining method data defining a method of machining in the each of at least one machining process, and shape definition data defining a shape contributing to the machining in the each of at least one machining process. The display controller is configured to handle the program data as a display candidate of the program data display area to allow at least one portion of the program data to be displayed on the program data display area as a display target of the program data display area, and handle defined shapes obtained from the shape definition data as a display candidate of the shape display area to allow at least one portion of the defined shapes to be displayed on the shape display area as a display target of the shape display area The shape definition data includes a set of material shape data defining a shape of a material, and at least one set of removed shape data each defined for a corresponding one of the at least one machining process and defining a shape to be removed by execution of the corresponding one of the at least one machining process, and the defined shapes includes at least one removed shape and workpiece shapes. The display controller is configured to, when, in a state in which the display target of the shape display area is displayed on the shape display area, a specific portion on the shape display area is designated via the input device, register a removed shape included in the at least one removed shape and comprising the specific portion included inside the removed shape into a machined shape table in which at least one candidate for the designated display target of the shape display area is registered, allow a designated display target candidate registered at a beginning of the machined shape table to be displayed as a designated display target of the shape display area so as to be differentiated from any other display target of the shape display area, and allow at least one portion of data being among at least one display candidate of the program data display area and sectioned by a machining process constituting the at least one machining process and corresponding to the designated display target of the shape display area to be displayed as a designated display target of the program data display area on the program data display area in a state in which a beginning of the at least one portion of data is set to a display start position of the program data display area. The display controller is configured to, when a portion whose distance to the specific portion is smaller than or equal to a predetermined length is successively designated via the input device, allow a next designated display target candidate to be displayed, in order of the registration into the machined shape table, as a designated display target of the shape display area on the shape display area so as to be differentiated from any other display target of the shape display area.

According to another aspect of the present invention, a machining program editing assist apparatus includes a display device, an input device to allow any point on a screen of the display device to be designated, a display controller configured to divide the screen into at least two display areas and control display on a program data display area and a shape display area among the display areas, and a machining program being for use in a machining tool and comprising program data that includes data sectioned for each of at least one machining process and that includes machining method data defining a method of machining in the each of at least one machining process, and shape definition data defining a shape contributing to the machining in the each of at least one machining process. The display controller is configured to handle the program data as a display candidate of the program data display area to allow at least one portion of the program data to be displayed on the program data display area as a display target of the program data display area, and handle defined shapes obtained from the shape definition data as a display candidate of the shape display area to allow at least one portion of the defined shapes to be displayed on the shape display area as a display target of the shape display area. The shape definition data defines shape instruction codes for each of code rows of the shape instruction codes and in order of execution of the shape instruction codes, and the shape instruction codes includes pieces of coordinate value data defining a movement path of a tool of the machining tool. The defined shapes include interconnection lines each of which sequentially interconnects, in accordance with the machining program, a pair of coordinate points among coordinate points each specified by a corresponding one of the pieces of coordinate value data, which are included in the shape instruction codes defined for each of the code rows. The display controller is configured to, when, in a state in which the display target is displayed on the shape display area, a specific portion on the shape display area is designated via the input device, register one of the interconnection lines which is a display target, and at least one portion of which is included in a predetermined area whose center is located at the specific portion, into a machined shape table as a candidate for the designated display target of the shape display area, and allow a designated display target candidate registered at a beginning of the machined shape table to be displayed on the shape display area as a designated display target differentiated from any other display target by allowing a line representing an interconnection line serving as the designated display target to be different, in at least one of a line type, a line width, and a color, from a line representing any other interconnection line serving as the any other display target. The display controller is configured to allow at least one portion of data being among at least one display candidate of the program data display area and sectioned by a machining process constituting the at least one machining process and corresponding to the designated display target of the shape display area to be displayed as a designated display target of the program data display area on the program data display area in a state in which a beginning of the at least one portion of data is set to a display start position of the program data display area. The display controller is configured to, when a portion whose distance to the specific portion is smaller than or equal to a predetermined length is successively designated via the input device, allow a next designated display target candidate of the machined shape table to be displayed as a designated display target of the shape display area on the shape display area in order of the registration into the machined shape table so as to be differentiated from any other display target of the shape display area.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a diagram illustrating an example of a machining program according to the first embodiment;

FIG. 6 is a plan view of an example of an editing assistance image according to the first embodiment;

FIG. 8 is a diagram illustrating an example of machining unit in a machining process according to the first embodiment;

FIG. 10 is a diagram illustrating an example of a machining unit in a machining process according to the first embodiment;

FIG. 13A and FIG. 13B are diagrams illustrating an example of processing when a portion on a shape display area has been tapped, in the first embodiment;

FIG. 19 is a diagram illustrating an example of a machining program according to a second embodiment;

FIG. 22 is a diagram illustrating a process information table according to the second embodiment;

FIG. 23 is a diagram illustrating a coordinate value table in the second embodiment;

FIG. 25A and FIG. 25B are diagrams illustrating processing when a portion on a process list display area has been tapped, in the second embodiment;

FIG. 26A and FIG. 26B are diagrams illustrating processing when a portion on a process list display area has been tapped, in the second embodiment;

DESCRIPTION OF THE EMBODIMENTS

Figure 1:
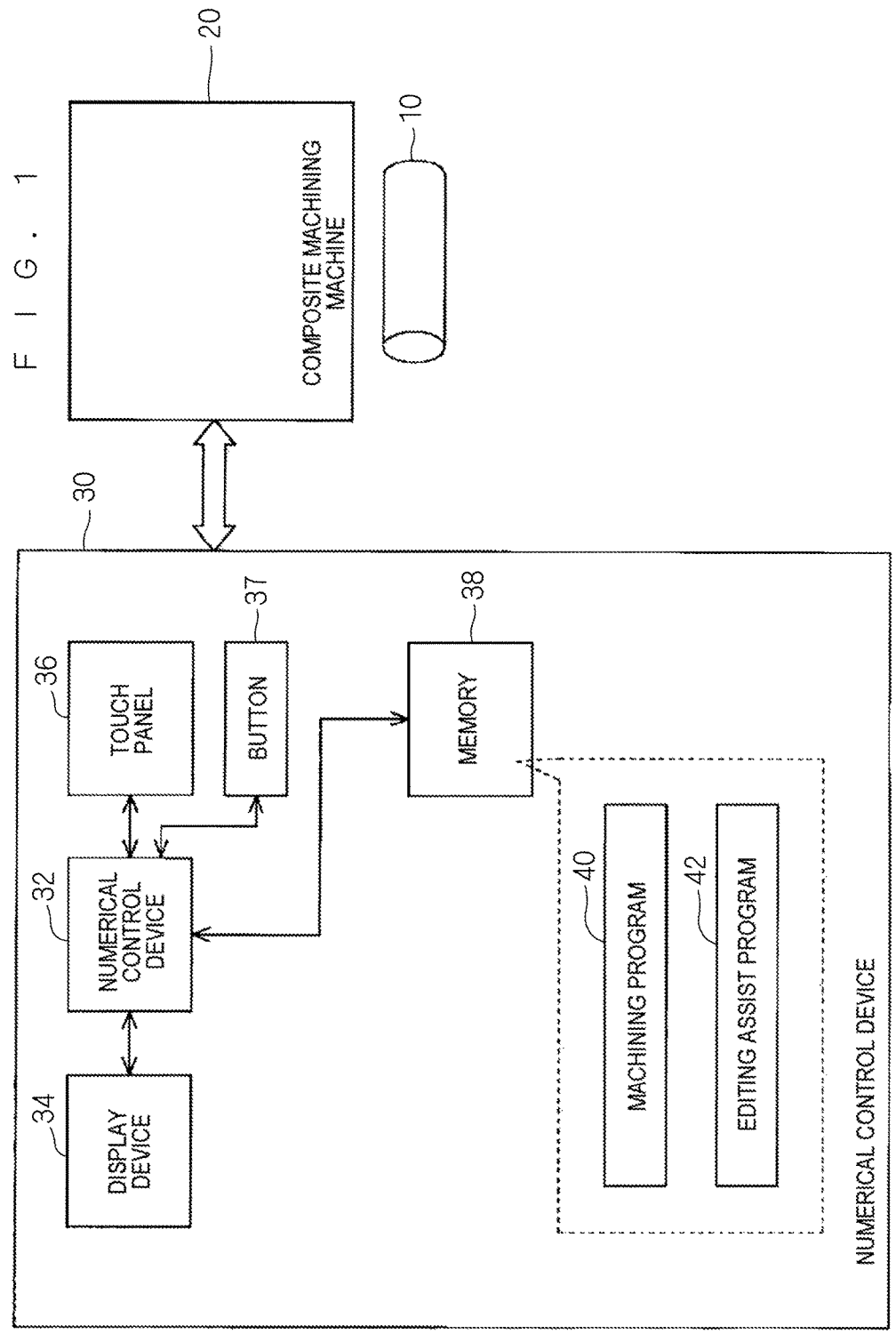
FIG. 1 is a diagram illustrating a system configuration of a machining program editing assist apparatus according to a first embodiment.

The embodiments will now be described with reference to the accompanying drawings, wherein like reference numerals designate corresponding or identical elements throughout the various drawings.

First Embodiment

Hereinafter, a first embodiment of the machining program editing assist apparatus will be described referring to the drawings.

FIG. 1 illustrates a system configuration of this embodiment.

A workpiece 10 is a machining target. A composite machining machine 20 includes the function of machining the workpiece 10 with a tool while causing the workpiece 10 to rotate, and the function of machining the workpiece 10 by causing the workpiece 10 to be fixed and causing a tool to move. In other words, the composite machining machine 20 is a machining tool that simultaneously has the functions of a lathe, a milling machine, a drilling machine, and any other single machining tool.

A numerical control device 30 transmits command signals to the composite machining machine 20. The command signals are used in machining of the workpiece 10 by the composite machining machine 20. The numerical control device 30 includes a central processing unit (CPU) 32, a display device 34, a touch panel 36, buttons 37, and a memory 38. The display device 34 includes, for example, a liquid crystal display panel or an organic EL display panel, and displays character strings and/or graphic images on its display screen. The touch panel 36 is disposed so as to overlap with the display screen of the display device 34. The touch panel 36 is an input device including the function of detecting a point which a finger or a pointing member, such as a pointing pen, is brought into contact with or close proximity to within a predetermined distance, as a designated point. The buttons 37 are input devices that are provided additionally to the touch panel 36 and are exclusively used for user's specific instructions to the numerical control device 30.

The memory 38 includes the function of storing, in itself, data such as programs installed in advance in the numerical control device 30, and temporarily storing data when the CPU 32 performs processing. Particularly, a machining program 40 and an editing assist program 42 are stored in the memory 38.

Figures 2, 3:
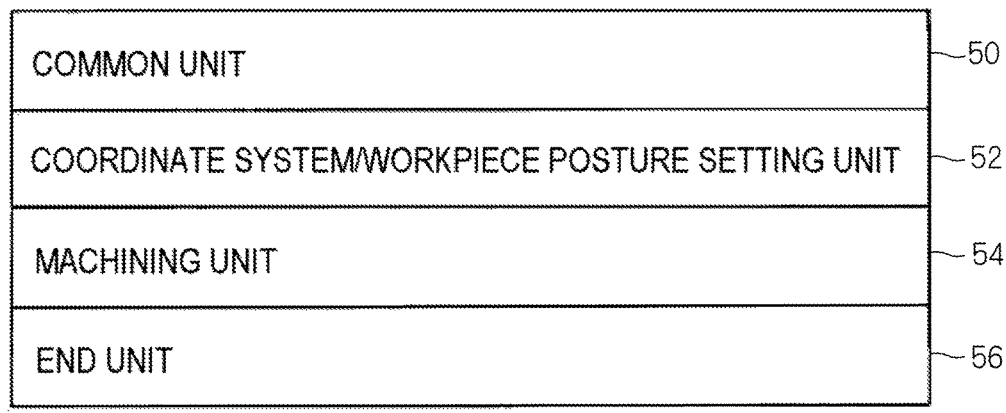
FIG. 2 is a diagram illustrating a configuration file of a machining program according to the first embodiment.
FIG. 3 is a diagram illustrating some kinds of machining units according to the first embodiment.

FIG. 2 illustrates an example of units constituting the machining program 40 according to this embodiment. Here, the units are sets of data for defining machining operations, the operations of peripheral devices of a machining tool, the setting positions of a workpiece, and any other setting information, and correspond to an example of sets of program data included in a machining program.

The machining program 40, according to this embodiment, is roughly constituted by a common unit 50, a coordinate system/workpiece posture setting unit 52, a machining unit 54, and an end unit 56. Here, the common unit 50 is a unit that is necessarily set at the beginning of the machining program 40 and is used for setting data common to the entire program, such as material property data and material shape data, and that includes a set of material shape data that defines the shape of the material. The coordinate system/workpiece posture setting unit 52 is a unit used for setting coordinate values of an original point of the machining program in a machine coordinate system (i.e., basic coordinates), attitudes of a workpiece when the workpiece is machined, and any other setting information. The machining unit 54 is a unit used for setting the contents of machining processes, and includes sets of machining method data each associated with a corresponding one of the machining processes and including a declaration of a machining method and conditions for the corresponding machining process, such as cutting conditions including, but are not limited to, a designation of a used tool, a machining allowance in a machining process, a rotation number of a spindle, and a feed rate of the tool. Further, the machining unit 54 includes sets of removed shape data being data that defines, for each machining process unit, a machined shape to be machined through each machining process, that is to say, a removed shape being a shape to be removed by execution of the each machining process.

Here, sets of shape definition data each defining a corresponding one of the shapes of a workpiece in machining includes the above set of material shape data and the above sets of removed shape data. The shape of the workpiece before execution of the machining program is defined by the set of material shape data. The shape of the workpiece after execution of each machining process is obtained by performing a set-difference operation on a shape of the workpiece before execution of the each machining process and a removed shape for the each machining process. Defined shapes that are shapes each obtained from a corresponding one of the sets of shape definition data are shapes contributing to machining and including the shape of a material, removed shapes, workpiece shapes that are shapes of the workpiece after the respective machining processes, and a product shape that is a workpiece shape after the completion of all of the machining processes. Further, the machining process unit is a unit handled by the machining program editing assist apparatus, and corresponding to one scope including one set of machining method data and one set of machined shape definition data.

The end unit 56 is a unit that is set at the end of the machining program 40 and indicates the end of the machining program.

FIG. 3 illustrates some kinds of units included in the machining unit 54.

Machining methods defined by the machining unit 54 are categorized into "a point machining unit", "a C-axis point machining unit", "a line machining unit", "a C-axis line machining unit", "a face machining unit", and "a turning machining unit", and each of these units is further categorized into small units. That is, for example, "the point machining unit" is further categorized into a "drill" unit, a "tap" unit, and any other small unit. A piece of data that is among pieces of data included in each of these units and that indicates a unit name and a unit number is an example of a piece of process name data indicating a process name of a machining process.

Figure 4:
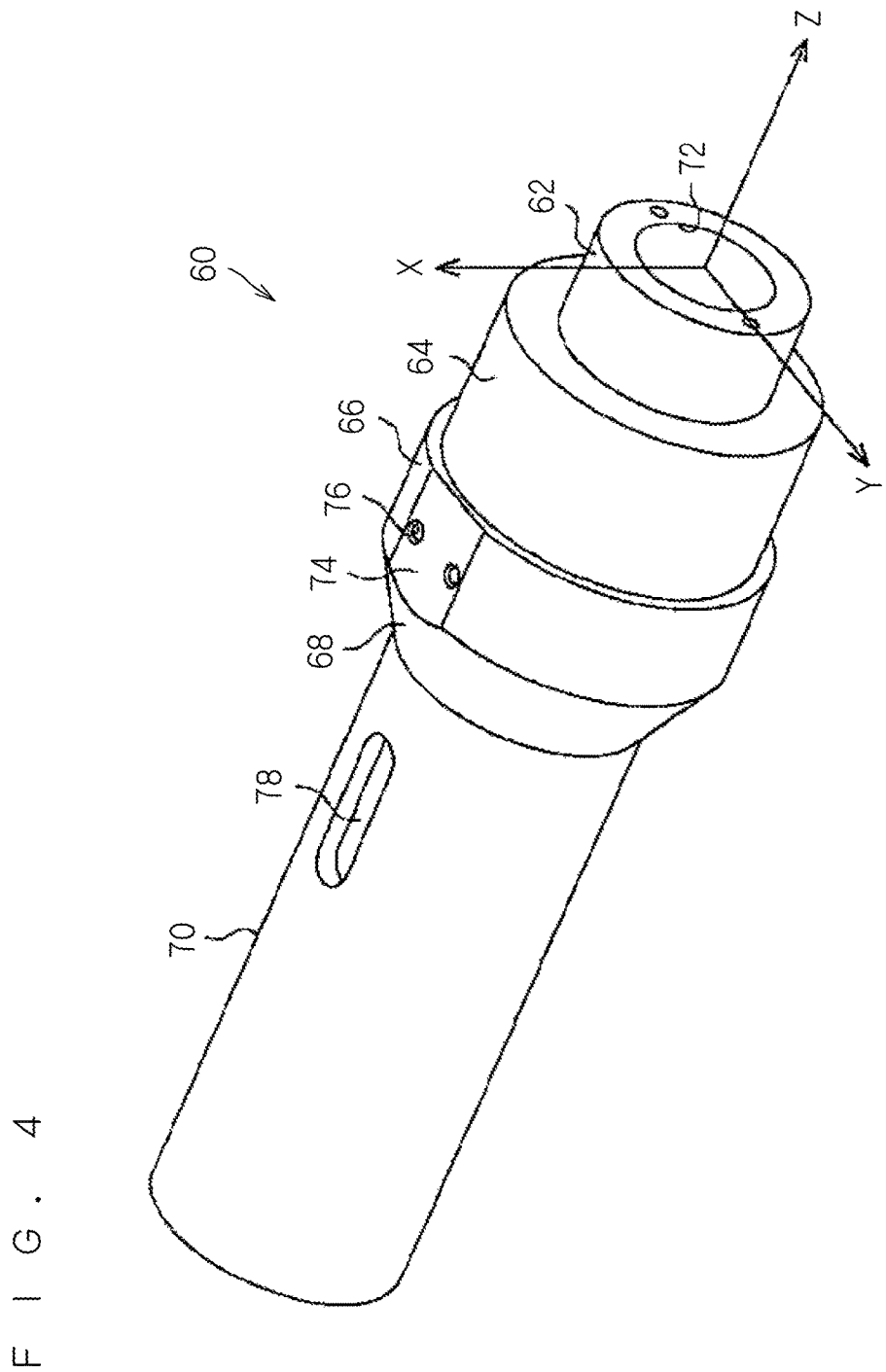
FIG. 4 is a perspective view of a product shape according to the first embodiment.

FIG. 4 illustrates a product shape 60, and this shape 60 is a workpiece shape at the time of completion of all machining processes to be performed on the workpiece 10, which is used in the description of this embodiment. The product shape 60 includes a first cylindrical column portion 62, a second cylindrical column portion 64, a third cylindrical column portion 66, a taper portion 68, and a fourth cylindrical column portion 70. The outer diameter of the second cylindrical column portion 64 is larger than that of the first cylindrical column portion 62. The outer shape of the third cylindrical column portion 66 is larger than that of the second cylindrical column portion 64. The taper portion 68 is formed from the third cylindrical column portion 66 so as to allow the outer diameter of the third cylindrical column portion 66 to be gradually reduced. The fourth cylindrical column portion 70 is coupled to the taper portion 68. Further, a face-mill face 74 is formed on the third cylindrical column portion 66, and part of the face-mill face 74 is made flat. Drill holes 76 are formed on the face-mill face 74. Further, a concave portion 78 is formed on the fourth cylindrical column portion 70.

FIG. 5 illustrates a configuration of the machining program 40, which is used for machining the workpiece 10 into the product shape 60. The machining program 40 is composed of a plurality of units, and these units include unit data constituting the sets of machining method data. The machining unit 54 is different from the other units in a respect that the machining unit 54 further includes tool sequence data (SNo.) constituting each of the sets of machining method data, and shape sequence data (FIG) that is an example of each of the sets of removed shape data.

Here, a unit whose unit number "Uno" is "0", that is, a first set of data of the machining program 40, corresponds to the common unit 50. Further, units whose unit numbers are "1", "2", "3", "5", "7", "8", and "11" correspond to the coordinate system/workpiece posture setting units 52. An "FRM" unit and an "FRM shift" unit are units each for setting a machining original point. A "head selection" unit is a unit for, in a machine including a plurality of workpiece spindles, declaring which of the workpiece spindles the machining is related to.

This unit does not exist in a machine including a single workpiece spindle. An "index" unit is a unit for setting the posture of a rotation shaft constituting the machine. In this case, the "index" unit before a "bar work" unit enables the setting of a B-axis angle of a tool spindle to instruct the posture of the tool spindle during a turning operation. Further, an "index" unit before a "facing-mill" unit and a "drill" unit enables the setting of a C-axis angle of the workpiece spindle to instruct on which face of the workpiece the machining is to be performed, or enables the setting of the B-axis angle of the tool spindle to instruct that the machining is to be performed on an oblique face. The "bar work" unit whose unit number is "4" is one of units having been categorized into the "turning unit" of the machining unit 54. The "turning unit" is a machining method that allows a workpiece to be machined by a tool while causing the workpiece to rotate, and the "bar work" unit is a machining method that allows a turning operation to be performed on a bar shaped workpiece. It should be noted here that the machining program 40 is a program in which, in order to machine the workpiece 10, processing (machining processing) performed by the composite machining machine 20 and the numerical control device 30 are described in order of machining processes constituting the machining processing, but the machining is not necessarily performed in order in accordance with the described machining processes and, for example, a setting that allows only finishing machining to be performed last is also applicable.

The editing assist program 42 is a program for assisting the creation and editing of the machining program 40.

Figure 6:
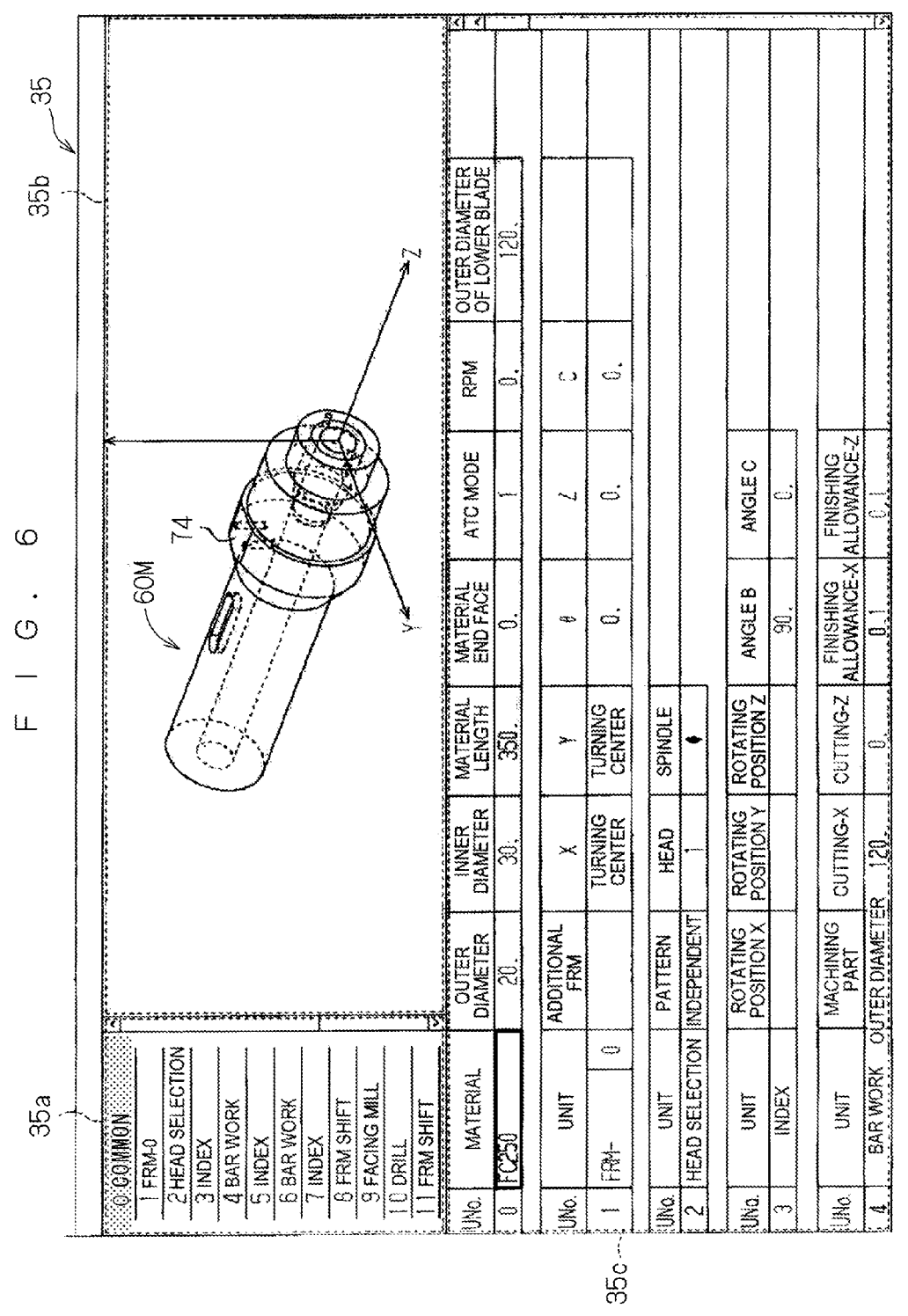

FIG. 6 illustrates an example of an editing assistance image that is displayed on a screen 35 of the display device 34 upon execution of the editing assist program 42 by the CPU 32.

With respect to the screen 35, on which the editing assistance image is displayed, a region other than a periphery portion at the upper side of FIG. 6 on the screen 35 is sectioned into a process list display area 35a, a shape display area 35b, and a program data display area 35c. The process list display area 35a is a display area whose display candidates are unit names and unit numbers of units constituting the machining program 40. Here, the unit names of units constituting the machining program 40 are examples of the process names of machining processes. Further, at least one portion of the display candidates (in FIG. 6, one portion corresponding to unit numbers "0 " to "11") is displayed on the process list display area 35a as a display target. In FIG. 6, display candidates whose unit numbers are "0 " to "11" are displayed on the process list display area 35a as display targets.

The shape display area 35b is a display area whose display candidates are shapes (3D models) defined by the machining program 40. When, actually, a shape is displayed on the shape display area 35b, an image resulting from converting a 3D model into a two-dimensional graphic is displayed as the shape. Describing in more detail, the display candidates of the shape display area 35b include the removed shapes, defined for the respective machining processes of the machining program 40, and workpiece shapes that are stepwise changed along with the execution of the machining program 40, and that are workpiece shapes at individual stages, begin from the shape of a material, and eventually come to the product shape 60 via deformations resulting from removals of the removed shapes through the respective machining processes, that is, workpiece shapes in which every two successive workpiece shapes before and after the individual machining processes are different from each other.

The program data display area 35c is a display area whose display candidates are pieces of data (detailed data) describing the content of the machining program 40. The pieces of detailed data are data describing the contents of the machining processes described by the machining program 40, and include the tool sequence data, the shape sequence data, and any other kind of data for the machining unit 54. Further, at least one portion of the pieces of detailed data, constituting the machining program 40, is displayed on the program data display area 35c as a display target. In FIG. 6, pieces of detailed data corresponding to the unit numbers "0" to "3" and a portion of pieces of detailed data corresponding to the unit number "4" are displayed on the program data display area 35c as the display target.

In FIG. 6, a scroll function provided at the right end of the process list display area 35a enables the display of units corresponding to larger unit numbers. Further, in the shape display area 35b, a pinch-out operation enables a product shape model 60M to be enlarged and displayed, and a pinch-in operation enables the product shape model 60M to be reduced and displayed. Further, another operation enables the product shape model 60M to shift in parallel, and further another operation enables the product shape model 60M to rotate. Further, in FIG. 6, a scroll function provided at the right end of the program data display area 35c enables the display of pieces of data describing further subsequent machining processes and included in the machining program 40.

Figure 7:
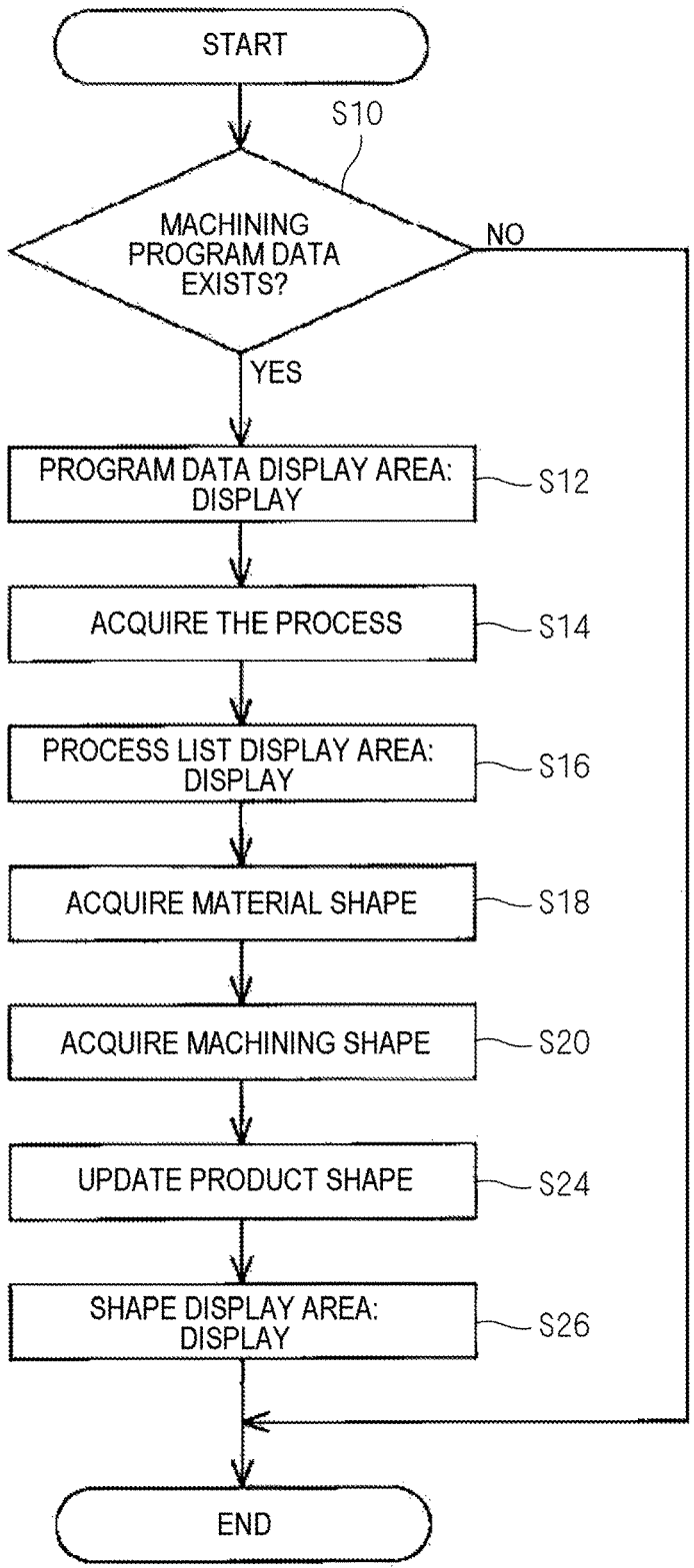
FIG. 7 is a flowchart illustrating a procedure of initial display processes according to the first embodiment.

FIG. 7 illustrates a procedure of displaying the editing assistance image shown in FIG. 6. The procedure shown in FIG. 7 is achieved by allowing the editing assist program 42 to be executed by the CPU 32. The procedure shown in FIG. 7 constitutes control by the display control unit (the display control controller).

In the series of procedure shown in FIG. 7, the CPU 32 first determines whether or not a designated machining program exists in the memory 38 (S10). In the case where it is determined that the designated machining program does not exist in the memory 38 (S10: NO), the CPU 32 terminates this series of procedure once. In contrast, in the case where the CPU 32 has determined that the designated machining program exists (S10: YES), the CPU 32 retrieves the machining program 40 to select only pieces of data, as display targets, that start from the beginning of the pieces of data (detailed data) of the machining program 40 and that are displayable on the program data display area 35c, and operates the display device 34 to allow an image of character strings representing the selected pieces of data to be displayed on the program data display area 35c (S12).

Next, the CPU 32 obtains data to be displayed on the process list display area 35a from the machining program 40 (S14). Describing in more detail, the CPU 32 obtains unit numbers and unit names that constitute the machining program 40 in the form of sets of a unit number and a unit name. Subsequently, the CPU 32 selects only sets of a unit number and a unit name, as display targets, that start from the beginning of the obtained sets of a unit number and a unit name and that are displayable on the process list display area 35a, and operates the display device 34 to allow an image of character strings representing the selected sets of a unit number and a unit name to be displayed on the process list display area 35a (S16).

Next, the CPU 32 obtains the set of material shape data for the workpiece 10 from the machining program 40, and converts the obtained set of material shape data into a 3D model (S18). Next, the CPU 32 obtains the machined shapes for the respective machining units on the basis of data included in the machining program 40 (S20). The machined shapes for the respective machining units are sets of data each defining the shape of a portion to be machined through a corresponding one of the machining units and be removed by the machining, and are included in the defined shapes. Hereinafter, the machined shapes will be also referred to as removed shapes. The CPU 32 is capable of calculating the removed shapes on the basis of data included in the machining units, and also converts the removed shapes into 3D models. Next, the CPU 32 creates the product shape model 60M using the material shape model, having been obtained in step S18, and machined shape models corresponding to the removed shape models having been obtained in step S20 and associated with the respective machining units (S24). In other words, in order to create the product shape model 60M, the CPU 32 executes the machining program from its beginning to its end so as to, in accordance with the machining program, perform, for each of the machining units, a process of creating a post-machining workpiece model, which is one example of the workpiece shapes, from a workpiece model representing a workpiece shape before the execution of the each machining unit by performing a set-difference operation in accordance with a machined shape model for the each machining unit. Hereinafter, the processing for creating the product shape model 60M will be described in detail.

FIG. 8 illustrates an example of a set of program data included in the "bar work" unit corresponding to the unit number "4" and included in the machining program 40 shown in FIG. 5. As shown in FIG. 3, the "bar work" unit is one of the small units included in the "turning unit". In this embodiment, in the "bar work" unit corresponding to the unit number "4", the designation of "machining portion" that is one of the pieces of definition information prescribing the "bar work" is "outer diameter", and this "bar work" unit corresponding to the unit number "4" is associated with, among machining processes for forming the outer circumference of the product shape 60 shown in FIG. 4, one machining process for forming the outer circumference through a turning operation.

As shown in FIG. 8, the machining unit 54 includes pieces of tool sequence data (SNo.) each prescribing a tool and cutting conditions for this tool, and pieces of shape sequence data (FIG) each prescribing a machined shape to be machined through this unit. The number of rows each associated with a corresponding one of the pieces of tool sequence data (SNo.) is the number of tools used in this unit, and a head character "R" and a head character "F" respectively indicate a tool for rough machining and a tool for finishing machining, and a numeric character described subsequently to each of "R" and "F" indicates usage order of a corresponding one of the two kinds of tools. There is no particular limitation in the total number of the rows associated with the respective pieces of shape sequence data (FIG).

Figure 9:
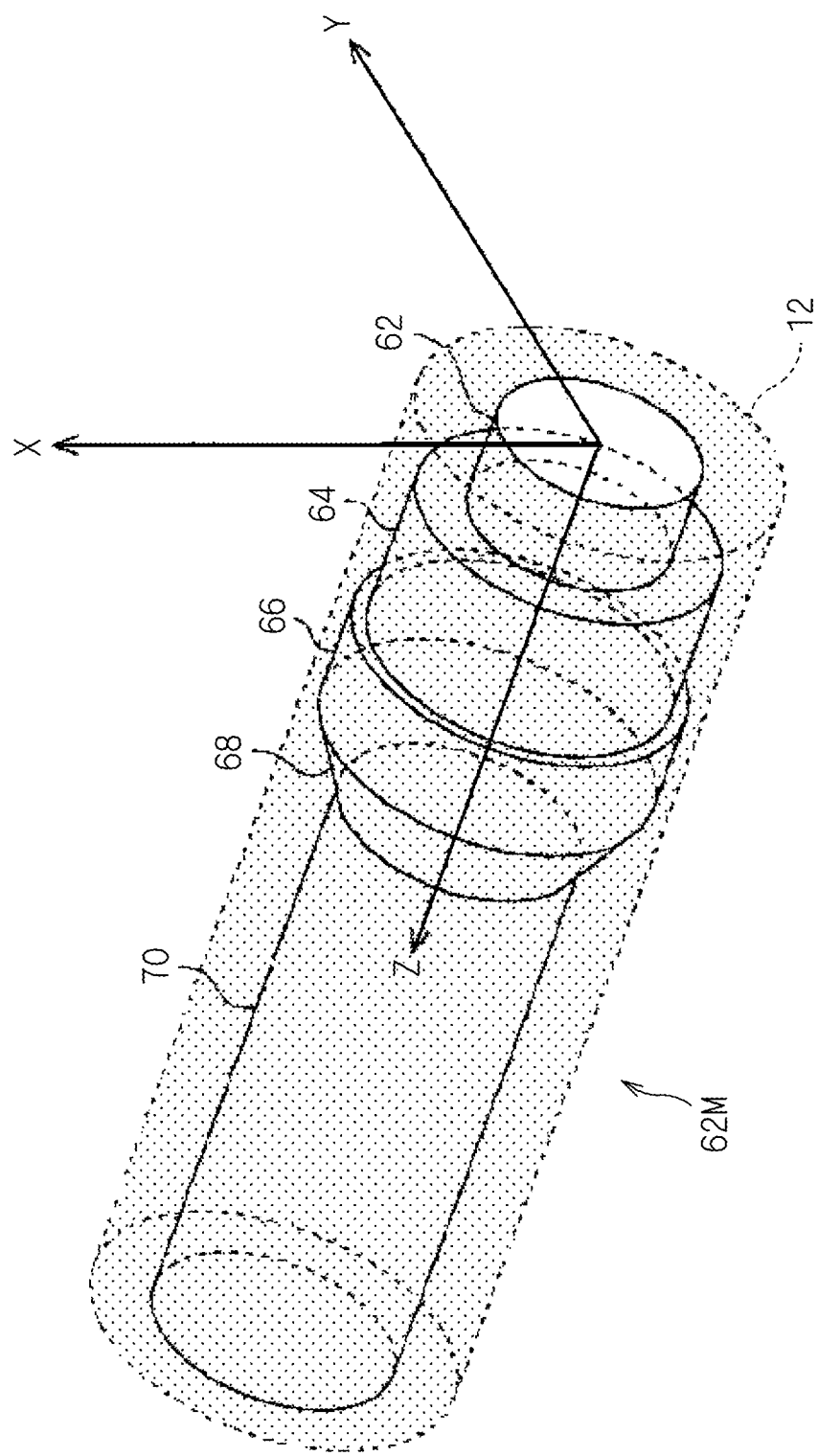
FIG. 9 is a perspective view of a machined shape determined through the machining process.
Figure 13B:
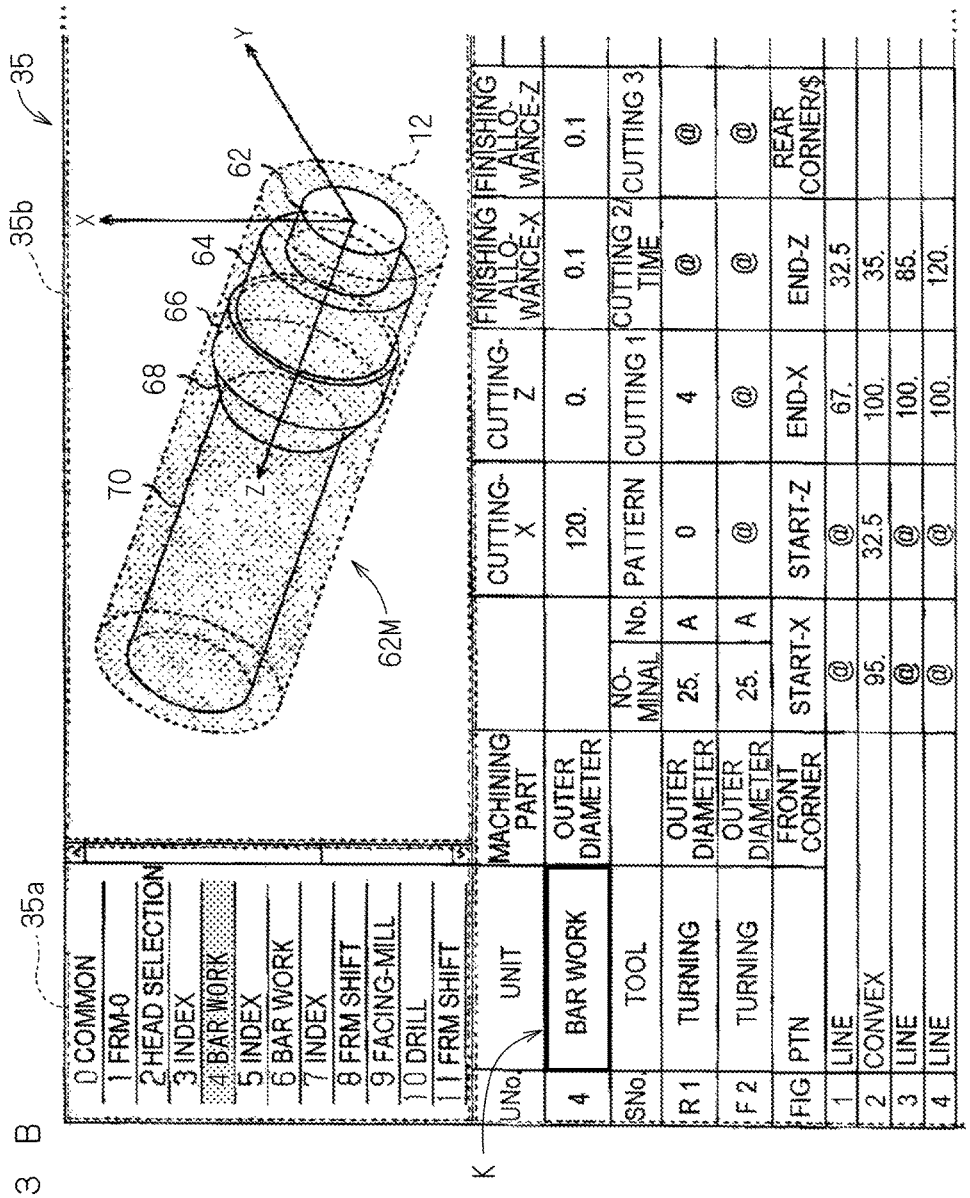
Figure 14A:
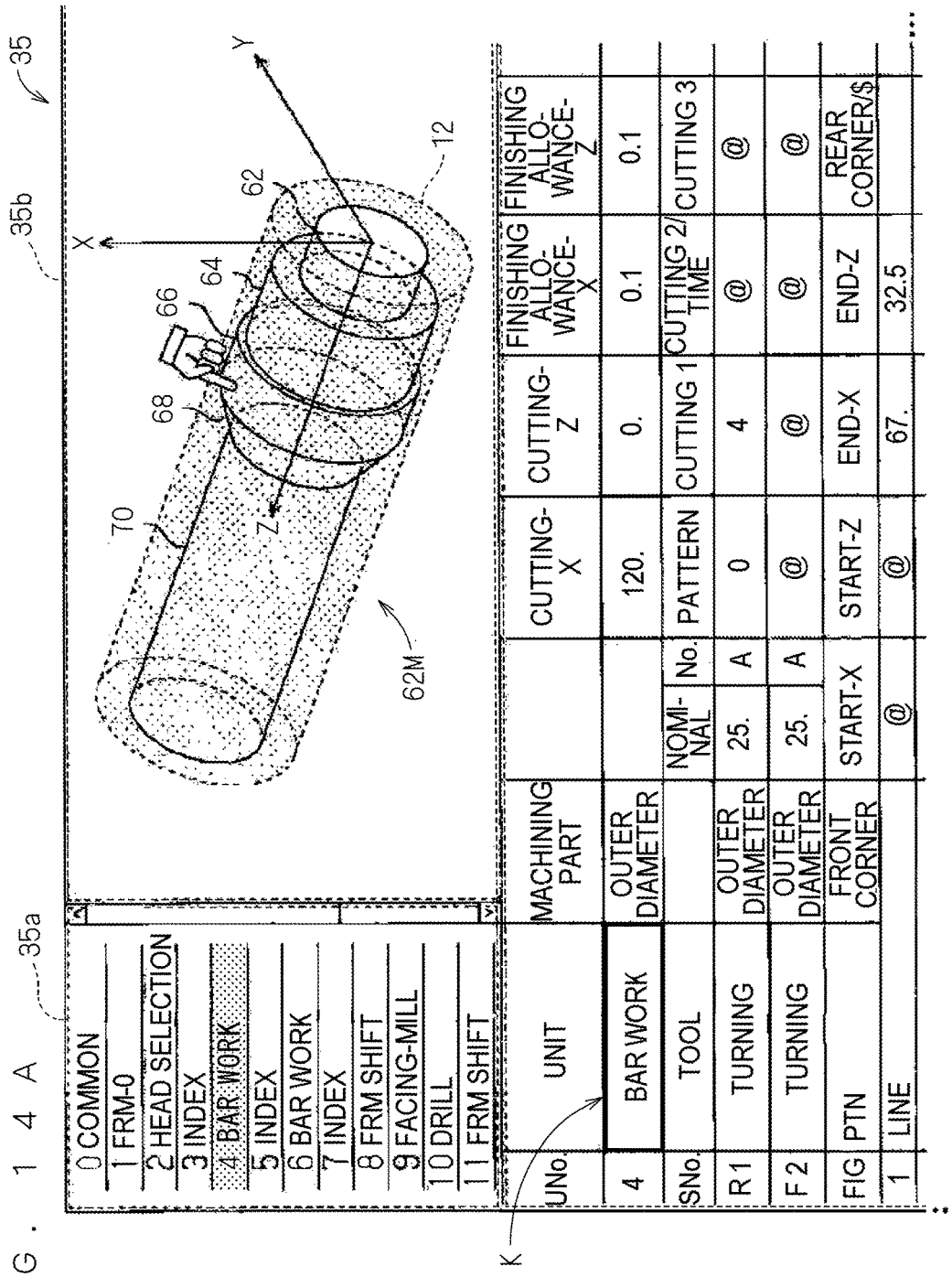
FIG. 14A and FIG. 14B are diagrams illustrating an example of processing when a portion on a shape display area has been tapped, in the first embodiment.

Each of points set in the rows associated with the respective pieces of shape sequence data (FIG) is prescribed by coordinate values of an X-axis, a Y-axis, and a Z-axis in the coordinate system exemplified in FIG. 4. The coordinate system is defined in the unit corresponding to the unit number "1" in the machining program 40 shown in FIG. 5. Pieces of shape sequence data (FIG) for a "turning unit" are pieces of data that define a cross-sectional shape of a rotating member on an XZ plane, and a shape to be removed (a removed shape) through a machining operation in this machining unit is capable of being specified by using this pieces of shape sequence data (FIG). In the example shown in FIG. 8, the pieces of shape sequence data (FIG) are composed of five rows of sequence data, "line" on a "1st" row being associated with the shape of the first cylindrical column portion 62, "line" on a "2nd" row being associated with the second cylindrical column portion 64, each of subsequent pieces of data being associated with a corresponding one of the third cylindrical column portion 66, the taper portion 68, and the fourth cylindrical column portion 70. A bar-work model resulting from this machining operation is obtained by rotating the cross-sectional shape having been defined on the XZ plane in such a way as described above. Further, performing a set-difference operation on the obtained bar-work model on the basis of the material shape model, which is a workpiece model before the machining operation corresponding to the unit number "4", enables obtaining a machined shape model 62M shown in FIG. 9. This machined shape model 62M is a shape model corresponding to the "bar work" unit, and is an example of the removed shapes included in the defined shapes. As shown in FIG. 9, FIG. 13B, and FIG. 14A, the machined shape model 62M is displayed in the shape display area 35*b* together with an orthogonal coordinate system symbol representing the position of an original point, and arrows indicating "+" directions of the respective X, Y, and Z axes in a coordinate system that is the basis of coordinate values defining the machined shape corresponding to the "bar work" unit. Even when a user who has not sufficiently leant to create the machining program has input coordinate values on the basis of an incorrect coordinate system, a shape different from his or her intended shape is displayed together with the orthogonal coordinate system symbol, and thus, the user is able to instantly notice that the input coordinate values are not correct values due to his or her misunderstanding of the coordinate system.

FIG. 10 illustrates an example of pieces of program data included in a "facing-mill" unit corresponding to a unit number "9" among the units constituting the machining program 40 and shown in FIG. 5. The "facing-mill" unit is one of the small units included in "the face machining unit", as shown in FIG. 3. In this embodiment, the face-mill face 74, shown in FIG. 4, is formed by a machining operation through the "facing-mill" unit.

Figure 11:
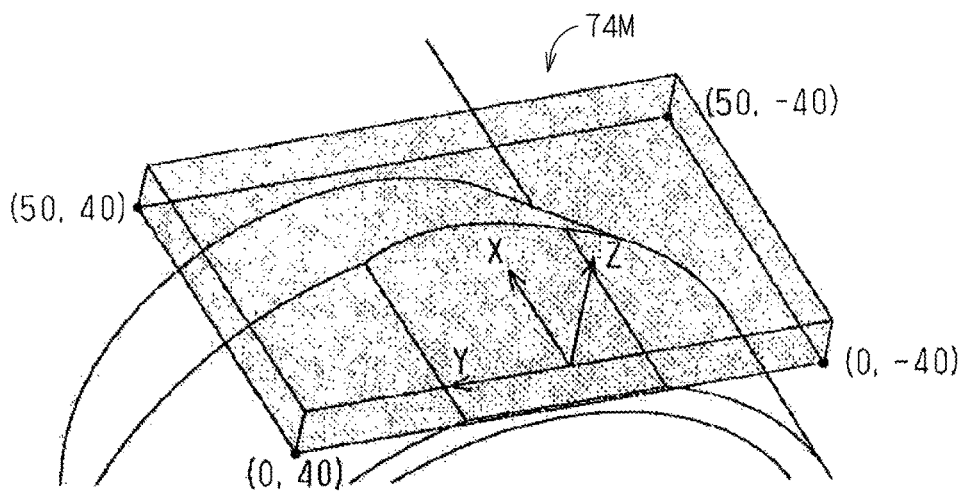
FIG. 11 is a perspective view of a machined shape determined through the machining unit.

Pieces of shape sequence data (FIG) shown in FIG. 10 are composed of four rows, and these four rows of shape sequence data prescribe a machining range of the "facing-mill" unit on an XY plane. Further, "depth" and "machining allowance-Z" that are pieces of information prescribing unit data respectively prescribe the height position of a machining face and a thickness. Here, the height position of the machining face corresponds to a position that is shifted from a Z-axis original point by a distance indicated by the piece of information "depth". The thickness corresponds to a thickness extending from the machining face and having a size indicated by the piece of information "machining allowance-Z". The use of pieces of data indicating the machining range, the height position of the machining face, and the thickness enables creation of a machined shape model 74M. This machined shape model 74M is a machined shape model corresponding to the "facing-mill" unit associated with a hatching portion shown in FIG. 11, and is an example of the removed shapes included in the defined shapes. As shown in FIG. 11 and FIG. 14A, the machined shape model 74M is displayed on the shape display area 35*b* together with coordinate values prescribed by pieces of shape sequence data (FIG) (i.e., XY coordinate values (50, 40), (0, 40), (0, −40), and (50, −40) of individual corners), and an orthogonal coordinate system symbol representing the position of an original point, and arrows indicating the "+" directions of the respective X, Y, and Z axes in a coordinate system defined in an "FRM shift" unit corresponding to the unit number "8". Thus, when a user has misunderstood a coordinate system having been set, or a user has erroneously performed a setting in relation to a coordinate system having been defined by program data, a machined shape model different from his or her intended shape is displayed. In such a case, however, since the orthogonal coordinate system symbol is displayed together with the machined shape model, the user is able to easily notice his or her misunderstanding or erroneous setting. Further, even when a user has erroneously input coordinate value data, since pieces of coordinate value data are displayed adjacent to coordinate points by which the machined shape model is prescribed, the user is able to easily notice his or her erroneous input by comparing magnitude and coordinate value data of an attention portion of the machined shape model with magnitude and coordinate value data of a different portion displayed at a position around the attention portion. Further, although, as described later, rough numerical values different from pieces of coordinate value data prescribing a machined shape model is allowed to be input, inputting of numerical values largely different from numerical values indicating an actual shape causes a situation in which a machining operation is performed at portions where the workpiece does not exist, and this situation leads to inefficient machining. With respect to this problem, even if a user has not sufficiently leant to operate the above device, it is easy for the user to realize further efficient machining in improvement of a machining program by changing coordinate value data while comparing numerical values of the coordinate value data with a machined shape model.

FIG. 10 illustrates an example in which the coordinate values prescribed by the pieces of shape sequence data (FIG) do not coincide with coordinate values of the boundary of the actual face-mill face 74. This is because the machining program 40 has been created in a simple and easy way. That is, inputting accurate values into the coordinates values of the boundary of the face-mill face 74 leads to a request for a complicated calculation by a user. Since, however, the purpose is, for example, to create a plane orthogonal to the Z-axis shown in FIG. 11 on the outer circumference of the third cylindrical portion 66, the boundary coordinates are not originally needed. The face-mill face 74 is uniquely determined upon determination of the coordinate values on the Z-axis. For this reason, when inputting coordinate values of individual elements of the X-axis and the Y-axis in the creation of the machining program 40, roughly inputting coordinate values supposed to be deviated from and located outside of the actual face-mill face 74 facilitates the inputting of the coordinate values. Even when, through such inputting, a machined shape broader than an actual machining face shown in FIG. 11 has been set, a post machining product shape is capable of being specified. That is, the face-mill face 74 is created on the workpiece model by allowing a set-difference operation in accordance with the machined shape model 62M for the "bar work" unit, which is shown in FIG. 9 and is an example of the defined shapes, to be performed on the material shape model, which is also an example of the defined shapes, and by further allowing a second set-difference operation in accordance with the machined shape model 74M for the "facing-mill" unit, which is shown in FIG. 11 and is also an example of the defined shapes, to be performed.

The product shape model 60M, shown in FIG. 4, is obtained by applying such a method to program data from the beginning to the end unit of the machining program 40.

Here, the description is returned to FIG. 7, and the CPU 32 displays the obtained workpiece model on the shape display area 35b (S26). When a designated machining program is initially displayed, a workpiece model resulting from applying the above method to all pieces of program data included in the displayed machining program is displayed on the shape display area 35b, and when a completed machining program is displayed, the product shape model 60M is displayed. All of the above processes are performed on the basis of a 3D model, and the 3D model is converted into a two-dimensional graphic on the basis of a view point having been set in order to display the 3D model on the shape display area 35b. That is, the 3D model is projected on a plane for display. The two-dimensional graphic is displayed on the shape display area 35b. Further, the CPU 32 terminates the series of procedure shown in FIG. 7 once.

In such a way described above, the CPU 32 displays the editing assistance image shown in FIG. 6 on the screen 35.

The CPU 32 executes the editing assist program 42 to realize the function of assisting the editing of the machining program 40 by a user through the use of the editing assistance images exemplified in FIG. 6. That is, as described above, the touch panel 36 is disposed on the screen 35 so as to overlap with the screen 35. Thus, when a user taps a portion included in the touch panel 36 and located right above a specific portion inside the screen 35 on the basis of an editing assistance image displayed on the screen 35, the CPU 32 is capable of specifying which portion of the editing assistance image has been designated, on the basis of an output signal from the touch panel 36. Further, when any one of display targets in any one of the process list display area 35a, the shape display area 35b, and the program data display area 35c is designated, the CPU 32 changes display targets on display areas other than the display area on which the designated display target is displayed into display targets so as to allow the changed display target to be associated with the designated display target. That is, any display area among the process list display area 35a, the shape display area 35b, and the program data display area 35c is a target display area, and when any one of display targets on the target display area is designated, the CPU 32 changes display targets on display areas other than the target display area into display targets so as to allow a machining process associated with the designated display candidate to coincide with a machining process associated with the changed display targets. In the following description, an event in which a portion included in the touch panel 36 and located right above a specific portion on an editing assistance image has been tapped will be also referred to as an event in which a specific portion on the editing assistance image has been tapped.

Figure 12:
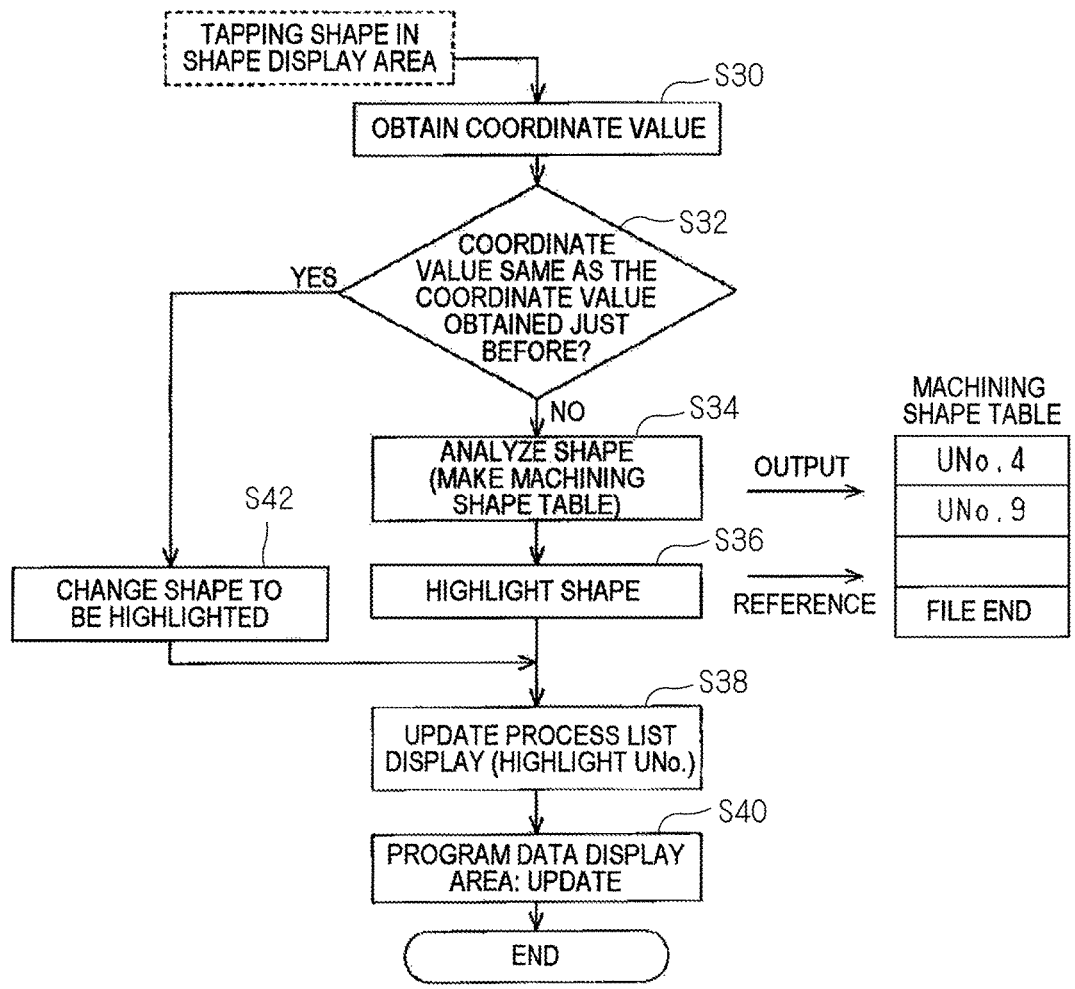
FIG. 12 is a flowchart illustrating a procedure when a shape display area has been tapped in the first embodiment.

FIG. 12 illustrates a procedure in the case where a specific portion on the shape display area 35b is designated. The procedure shown in FIG. 12 is achieved by allowing the editing assist program 42 to be executed by the CPU 32. The procedure shown in FIG. 12 constitutes control by the display control unit.

When a specific portion on the shape display area 35b has been tapped in a state in which a display target is displayed on the shape display area 35b, the CPU 32 acquires coordinate values on the screen 35 that correspond to the tapped point (designated point) on the basis of output values from the touch panel 36 (S30). Further, the CPU 32 determines whether or not the acquired coordinate values are same as coordinate values of an immediately previously acquired, designated point (S32). In this determination, a region having a predetermined radius from the designated point having been immediately previously acquired is defined in advance, and in the case where the coordinate values having been acquired this time fall within the region, it may be determined that the coordinate values having been acquired this time are the same as the coordinate values of the designated point having been immediately previously acquired.

Further, in the case where it is determined that the acquired coordinate values are not the same as the coordinate values of designated point having been immediately previously acquired (S32: NO), on the basis of the above designated point and the display target displayed on the shape display area 35b, the CPU 32 extracts a display candidate specified from the above designated point and the display target as a display candidate having been designated by a user from among display candidates of the shape display area 35b, and creates a machined shape table (S34). Specifically, although not explicitly displayed, in the product shape model 60M displayed on the shape display area 35b, the CPU 32 also covers machined shape models (removed shapes) of individual machining units into two-dimensional shapes under the same condition as that for the product shape model 60M, and retains the resultant two-dimensional shapes. As described above, a workpiece model (a workpiece shape) after a machining operation by a machining unit is created by performing a set-difference operation on a workpiece model (a workpiece shape) before the machining operation by the machining unit and a machined shape model (a removed shape) of the machining unit, and thus, a machined shape model (a removed shape) corresponding to a machining portion machined by each of the machining units associated with the product shape model 60M surely exists. Further, the CPU 32 determines whether or not the designated coordinate values fall within a region of each of the machined shape models having been converted into two-dimensional graphics, extracts machining units each having a machined shape model in which the coordinate values of the designated point are included, and creates the machined shape table. FIG. 12 illustrates an example of the machined shape table, and in this example, two extracted units corresponding to the unit numbers "4" and "9" are listed. It should be noted here that the extracted machining unit is a machining unit that, when a removed shape of the machining unit is displayed on the shape display area 35b, allows the specific portion (the designated point) to be included inside the removed shape.

FIG. 13A illustrates a case where the face-mill face 74 of the product shape model 60M displayed on the shape display area 35b is tapped. Here, the CPU 32 extracts not only a machining unit that machines the face mill surface 74, but also machining units each having a removed shape, inside which the designated point is included, on a two-dimensional image on the shape display area 35b, and arranges the extracted machining units in order of programs included in the machining program 40 to create the machined shape table. Here, obviously from FIG. 13A, since the designated point is included in a machined shape corresponding to the face-mill face 74, and a machined shape being adjacent to the third cylindrical portion 66 defined in the "bar work" unit and corresponding to the "bar work" unit, these units are arranged in machining order to create a machined shape table containing the unit numbers "4" and "9".

The description is returned to FIG. 12, and the CPU 32 selects a machined shape model having the earliest order in the machined shape table, that is, a machined shape model registered at the beginning of the machined shape table, from among machined shape models included in the machining unit 54 and designated by the machined shape table, and operates the display device 34 to allow the selected machined shape model to be displayed in a highlighted manner as a designated display target (S36).

FIG. 13B illustrates an example of the result of tapping a portion located on the touch panel 36 and corresponding to a portion inside the face-mill face 74 displayed on the shape display area 35b. The CPU 32 acquires the unit number "4" from the machined shape table, and displays the machined shape model 62M of the "bar work" unit on the shape display area 35b, as shown in FIG. 13B, so as to allow the machined shape model 62M for the "bar work" unit to be superimposed and displayed on a pre-machining workpiece model corresponding to the unit number "4" In this embodiment, the machined shape model 62M is displayed in a highlighted manner by changing the color and increasing the brightness of the machined shape model 62M, but in FIG. 13B, the machined shape model 62M is represented in a hatched manner. Here, the highlighted display is intended to differentiate and highlight the machined shape model 62M relative to workpiece models that are other display targets displayed on the shape display area 35b. In this case, since no machining unit exists before the machining unit corresponding to the unit number "4", a workpiece model at this time point is the same as the material shape model, and as having already been described in the method for creating the machined shape model of the "bar work" unit, the material shape model is represented as part of the machined shape model 62M of the "bar work" unit.

The description is returned to FIG. 12, and the CPU 32 operates the display device 34 to allow a highlighting display portion, that is, a designated display target among display targets displayed on the process list display area 35a, to be updated to a highlighting display portion corresponding to a highlighting display portion on the shape display area 35b (S38). That is, a state in which, as shown in FIG. 13A, the "common" unit corresponding to the unit number "0" is displayed in a highlighted manner as a designated display target is changed to a state in which, as shown in FIG. 13B, the "bar work" unit corresponding to the unit number "4" is displayed in a highlighted manner as a designated display target. In this embodiment, a machining process (a unit name) is displayed in a highlighted manner by changing the color and increasing the brightness of the machining process, but in FIG. 13B, the machining process is represented in a hatched manner.

The description is returned to FIG. 12, and the CPU 32 operates the display device 34 to, on the program data display area 35c, allow pieces of program data included in the "bar work" unit corresponding to the unit number "4" to be selected as a designated display target, allow the beginning of the pieces of program data to be set to the display start position of the program data display area 35c, and allow a cursor K to be moved to the beginning of the pieces of program data (S40). That is, a state in which, as shown in FIG. 13A, the beginning of pieces of program data corresponding to the unit number "0" and having been selected as a designated display target is set to the display start position of the program data display area 35c is changed to a state in which, as shown in FIG. 13B, the beginning of pieces of program data corresponding to the unit number "4" and having been selected as a designated display target has been set to the display start position of the program data display area 35c. This setting of the pieces of program data is performed to, among display candidates of the program data display area 35c, allow a designated display target to be displayed so as to be differentiated.

In FIG. 13B, an example in which the cursor K is moved to a character string "bar work" that is displayed at the right-hand side of a portion indicating that the unit number is "4". A state in which a piece of data is pointed by the cursor K indicates that the piece of data is changeable. In this regard, however, the cursor K is also intended to allow a designated display target to be differentiated and highlighted relative to display candidates other than the designated display target.

The description is returned to FIG. 12, and in the case where, in step S32, the CPU 32 determines that the acquired coordinate values are the same as the coordinate values of the designated point having been immediately previously acquired (S32: YES), the CPU 32 selects a unit included in the machining unit 54 and corresponding to a next unit number of the machined shape table as a designated display target and displays the selected unit in a highlighted manner (S42).

Figure 14B:
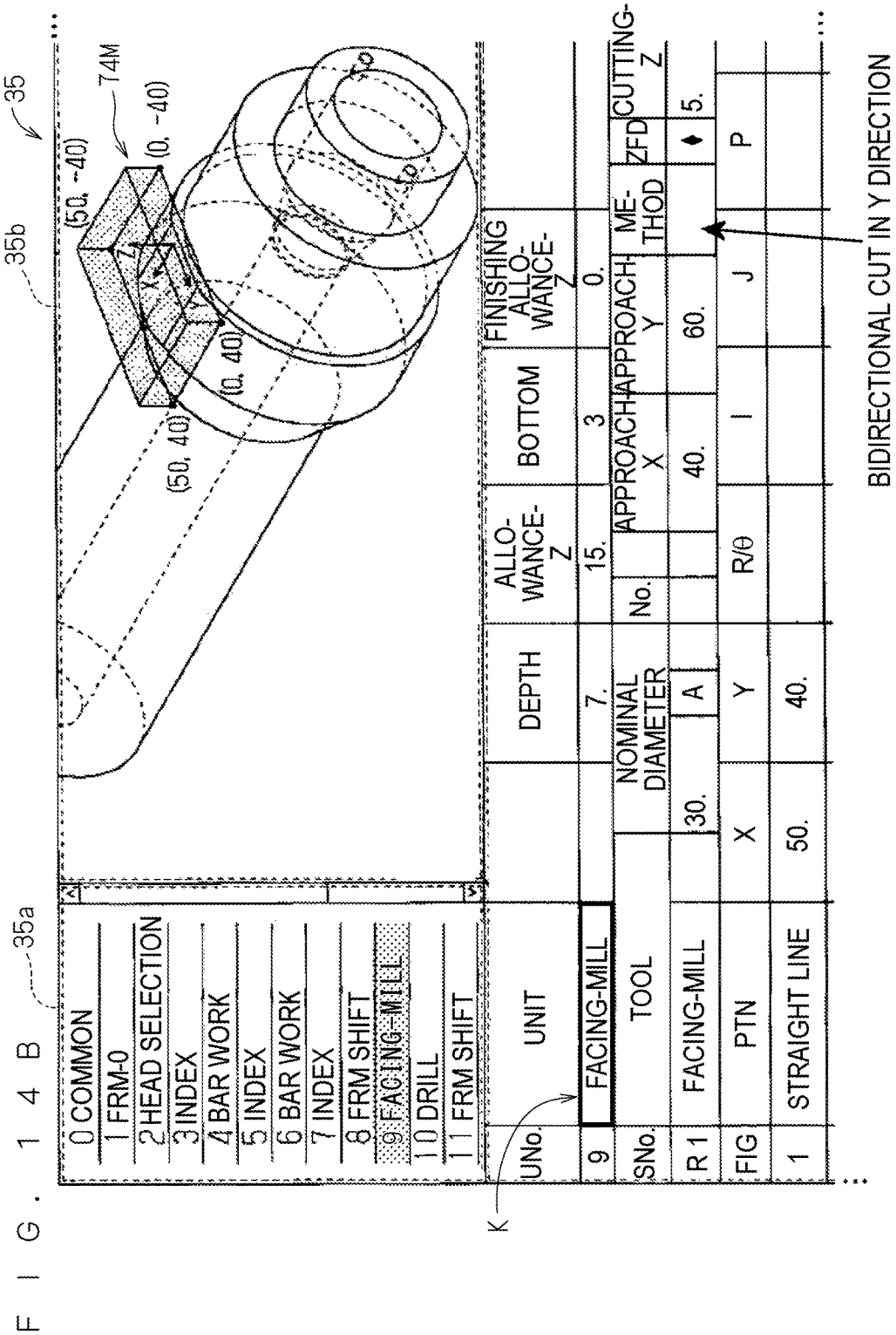

FIG. 14A illustrates a case where, in a state in which the "bar work" unit corresponding to the unit number "4" is selected as a designated display target and is displayed in a highlighted manner, a portion where the face-mill face 74 had been displayed is tapped again. The CPU 32 determines that the coordinate values of a tapped position are the same as those of the immediately previously tapped position, and acquires the unit number "9", which is positioned next to the unit number "4" having been selected as the immediately previously highlight target. Further, as shown in FIG. 14B, in a pre-machining workpiece model corresponding to the unit number "9" and displayed on the shape display area 35b, the CPU 32 selects a machined shape to be machined through the "facing-mill" unit, as a designated display target, and displays the selected machined shape in a highlighted manner. Further, the CPU 32 executes processes in step S38 and S40 of FIG. 12 to update the display of the process list display area 35a and the display of the program data display area 35c. FIG. 14B illustrates a state in which, when the "face-mill" corresponding to the unit number "9" is selected as a designated display target and is displayed in a highlighted manner on the process list display area 35a, pieces of detailed data included in the "face mill" unit corresponding to the unit number "9" are selected as a designated display target, and the pieces of detailed data is displayed on the program data display area 35c in a state in which the beginning of the pieces of detailed data is set to the display start position of the program data display area 35c. When the face-mill face 74 is further tapped in a state in which the "facing-mill" unit corresponding to the unit number "9" is selected as a designated display target and is displayed in a highlighted manner, in the case where any unit number is not registered next to the unit number "9" in the machined shape table, a unit number registered at the beginning of the machined shape table, that is, the unit number "4", is employed. Thus, the "bar work" unit corresponding to the unit number "4" is selected as a designated display target again, and is displayed in a highlighted manner. That is, a candidate that is cyclically selected from among candidates for a designated display target in order of the registration into the machined shape table is selected as a next designated display target.

The description is returned to FIG. 12, and after the completion of the process of step S40, the CPU 32 terminates this series of procedure once.

According to the procedure shown in FIG. 12, when a user has felt that there is a portion that the user is worried about in a machined shape displayed on the shape display area 35b, the user is able to, by tapping the portion, promptly grasp which of the entire series of machining processes a machining process that machines the machined shape corresponds to through the highlighted display on the process list display area 35a. Further, the user is able to promptly grasp the content of the pieces of detailed data included in the machining program 40 and being displayed on the program data display area 35c in a state in which the beginning of the of pieces of detailed data is set to the display start position of the program data display area 35c.

Figure 15:
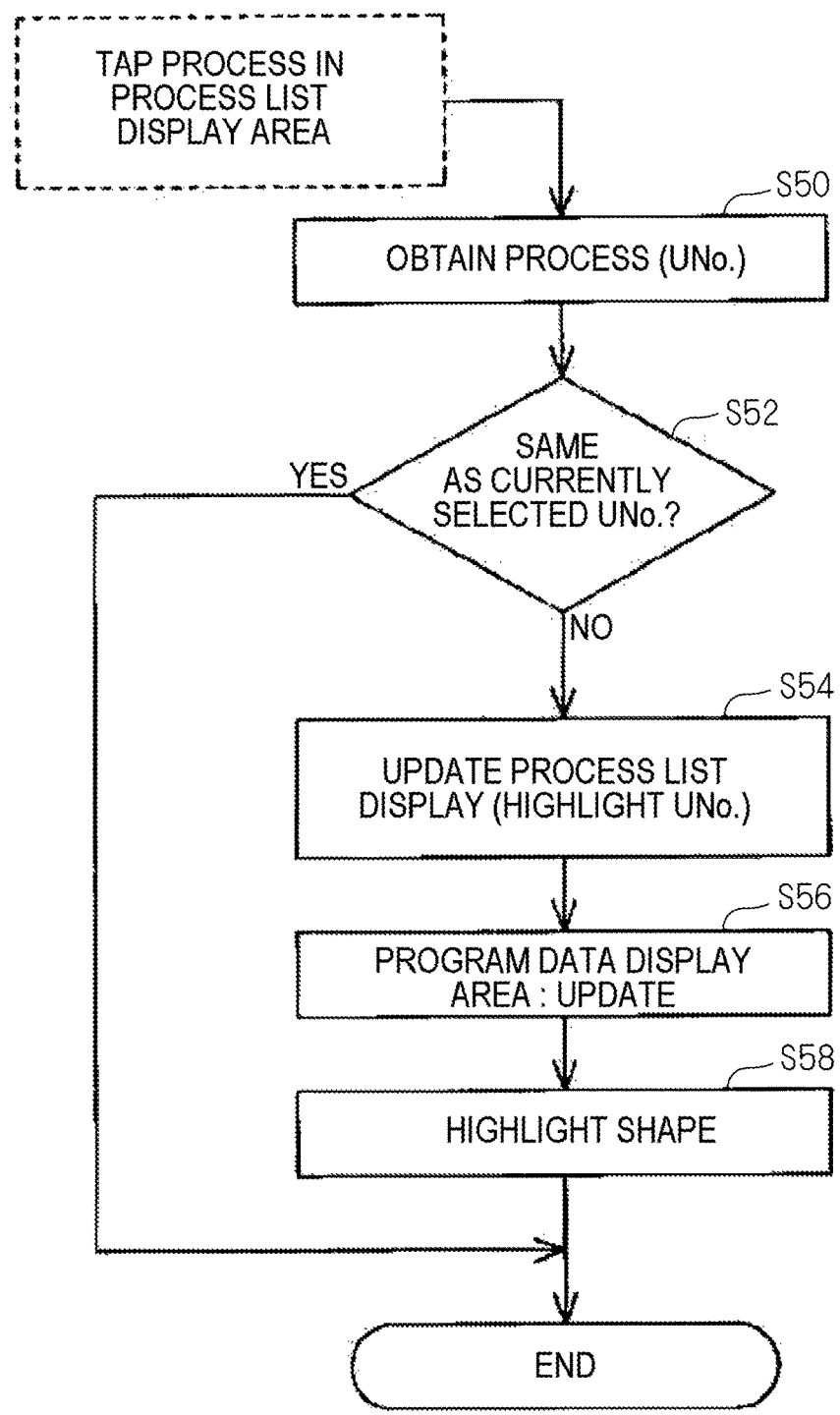
FIG. 15 is a flowchart illustrating an example of a procedure when a portion on a process list display area has been tapped, in the first embodiment.

FIG. 15 illustrates a procedure in the case where a specific portion on the process list display area 35a is designated. The procedure shown in FIG. 15 is achieved by allowing the editing assist program 42 to be executed by the CPU 32. The procedure shown in FIG. 15 constitutes control by the display control unit.

When one of unit numbers displayed on the process list display area 35a is tapped, or one of character strings representing unit names displayed on the process list display area 35a is tapped, the CPU 32 acquires a unit number indicated by an image displayed on a region including a tapped specific portion, as a designated unit number, on the basis of output values from the touch panel 36 (S50). Next, the CPU 32 determines whether or not the acquired unit number is a currently selected unit number (S52). Further, in the case where it is determined that the acquired unit number is not the currently selected unit number (S52: NO), the CPU 32 operates the display device 34 to allow a highlighting target unit among units displayed on the process list display area 35a to be changed to the selected unit number (S54). In other words, the designated display target is updated. Subsequently, the CPU 32 operates the display device 34 to, on the program data display area 35c, allow the beginning of pieces of detailed data included the machining program 40 and corresponding to the unit number having been acquired in step S50 to be set to the display start position of the program data display area 35c, and allow the cursor to be moved to the beginning of the pieces of detailed data (S56). Further, the CPU 32 operates the display device 34 to allow a removed shape to be machined by a machining process corresponding to the designated unit number to be displayed in a highlighted manner as a designated display target (S58). Here, in the case where, before the process of step S58, a different portion is displayed in a highlighted manner on the shape display area 35b as a designated display target, the CPU 32 erases all display targets on the shape display area 35b once, and then displays a newly set designated display target in a highlighted manner relative a workpiece model. With this process, for example, when the display on the shape display area 35b is in a state exemplified in FIG. 14A, upon tapping of a character string representing "face-mill" corresponding to the unit number "9" and displayed on the process list display area 35a, the display on the shape display area 35b is updated as shown in FIG. 14B. Incidentally, when the unit number tapped in step S50 is not a unit number designating pieces of data included in the machining unit 54, any machined shape is not displayed in a highlighted manner.

When the result of the determination in step S52 is "YES" or when the process of step S58 has been completed, the CPU 32 terminate this series of procedure once.

According to the procedure shown in FIG. 15, when a user has become worried about a specific machining process on the basis of a list of machining processes displayed on the process list display area 35a, the user is able to, by tapping a region in which an image representing the machining process is displayed, promptly grasp a machined shape to be machined by the machining process, through the highlighted display on the shape display area 35b. Further, the user is able to, through pieces of data which are included in the machining program 40 and the beginning of which is set to the display start position of the program data display area 35c, promptly grasp the content of the pieces of detailed data describing the content of the machining process.

Figure 16:
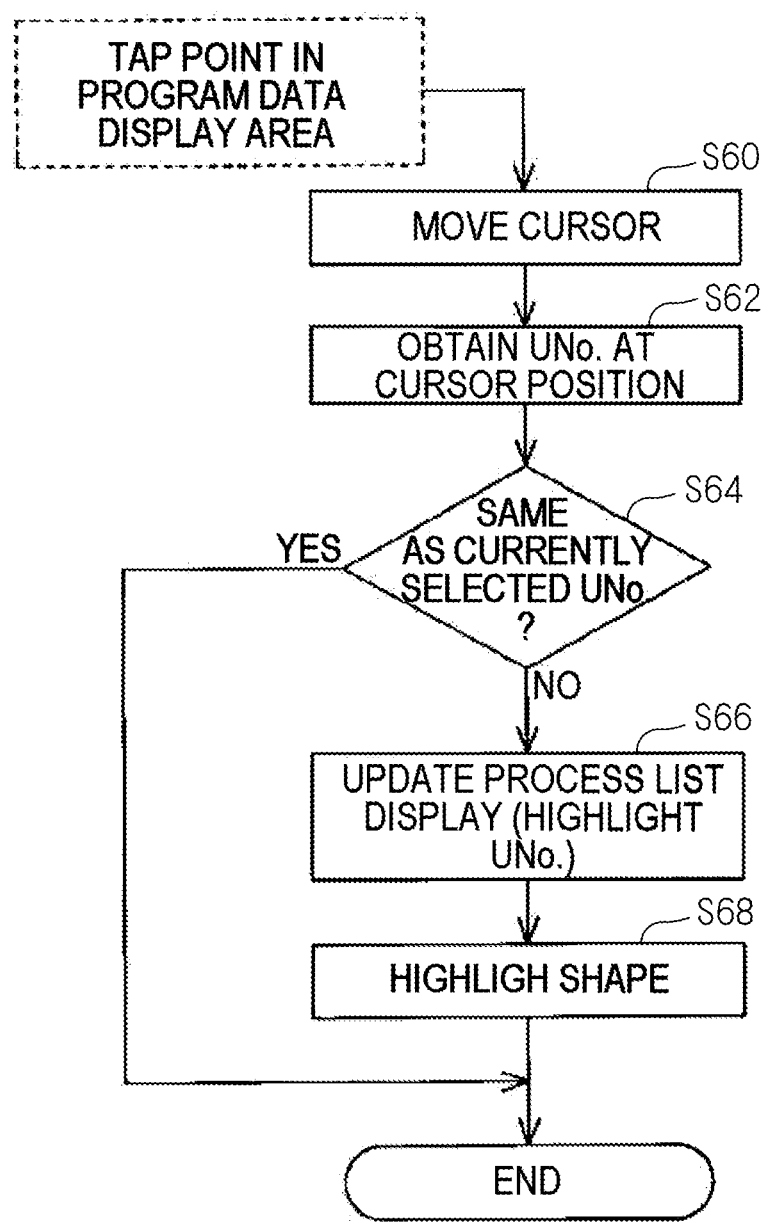
FIG. 16 is a flowchart illustrating an example of a procedure when a portion on a program data display area has been tapped, in the first embodiment.

FIG. 16 illustrates a procedure in the case where a specific portion on the program data display area 35c is designated. The procedure shown in FIG. 16 is achieved by allowing the editing assist program 42 to be executed by the CPU 32. The procedure shown in FIG. 16 constitutes control by the display control unit.

When a specific portion on the program data display area 35c has been tapped, the CPU 32 determines that a piece of data displayed in a region including the specific portion has been designated by a user, on the basis of output values from the touch panel 36, and then operates the display device 34 to allow the cursor K to move to the piece of data (S60). Next, the CPU 32 acquires a unit number corresponding to the piece of data to which the cursor K has been moved (S62). Next, the CPU 32 determines whether or not the acquired unit number is a currently selected unit number (S64). In other words, the CPU 32 determines whether or not the acquired unit number is a unit number being displayed as a designated display target. Further, in the case where it is determined that the acquired unit number is not the currently selected unit number (S64: NO), the CPU 32 operates the display device 34 to allow a highlighting target on the process list display area 35a to be updated (S66). Further, the CPU 32 operates the display device 34 to allow a highlighted target on the shape display area 35b to be updated (S68). Here, in the case where pieces of data designated by the unit number are included in the machining unit 54, the CPU 32 changes the highlighting target. With these processes, when the display of the shape display area 35b is in a state shown in FIG. 14A, when, in a state in which the display of the program data display area 35c has been scrolled and a character string representing data corresponding to "face-mill" associated with the unit number "9" is displayed, the character string is tapped, the display of the shape display area 35b is updated as shown in FIG. 14B. In contrast, in the case where the pieces of data designated by the unit number are not included in the machining unit 54, the CPU 32 does not perform displaying in a highlighted manner.

When the result of the determination in step S64 is "YES" or when the process of step S68 has been completed, the CPU 32 terminate the series of procedure shown in FIG. 16 once.

According to the procedure shown in FIG. 16, a user is able to, by tapping a piece of data displayed on the program data display area 35c, promptly grasp a machining process described by the tapped piece of data, through the highlighting display on the process list display area 35a. Further, the user is able to promptly grasp a machined shape to be machined through the machining process by the highlighting display on the shape display area 35b.

According to the procedure in FIGS. 12, 15, and 16, a user is able to easily recognize machining processes, machined shapes to be machined through the respective machining processes, and sets of detailed data included in programs for the respective machining processes in a way that allows the machining processes, the machined shapes, and the sets of detailed data to be associated with one another.

Figure 17:
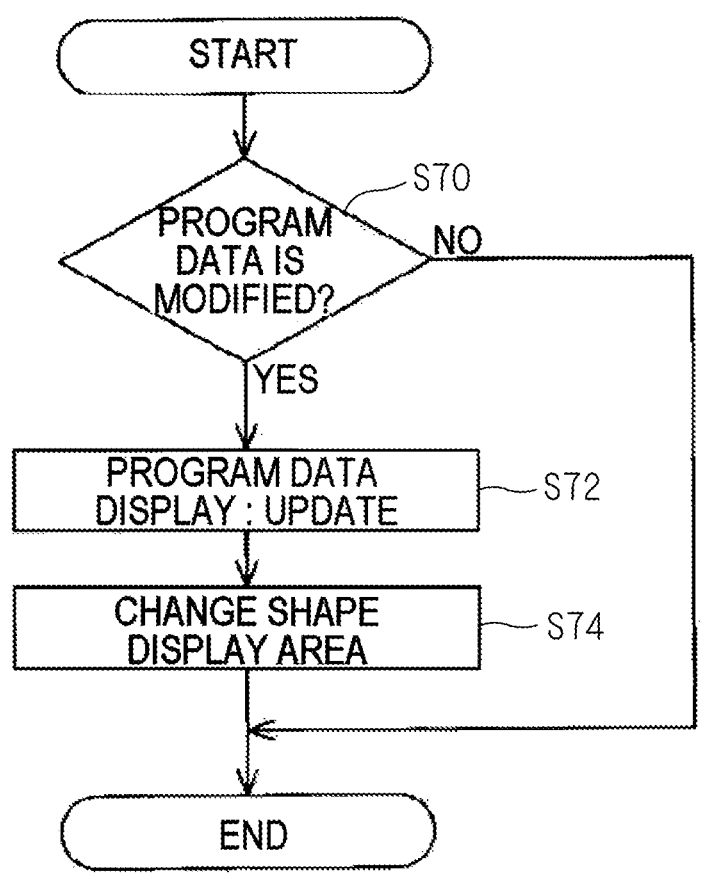
FIG. 17 is a flowchart illustrating an example of a procedure when data on a program data display area has been updated, in the first embodiment.

FIG. 17 illustrates a procedure when pieces of data displayed on the program data display area 35c are changed by operations of the buttons 37 or any other operation tool. The procedure shown in FIG. 17 is achieved by allowing the editing assist program 42 to be executed by the CPU 32. The procedure shown in FIG. 17 constitutes control by the display control unit.

In the series of procedure shown in FIG. 17, the CPU 32 determines whether or not any change exists in program values displayed on the program data display area 35c (S70). Further, in the case where a change exists in the program values (S70: YES), the CPU 32 updates the image of a program displayed on the program data display area 35c (S72). Further, the CPU 32 changes a machined shape displayed on the shape display area 35b on the basis of the changed program value (S74). When the processes of step S74 have been completed, or when the result of the determination in step S70 is "NO", the CPU 32 terminates this series of procedure once.

Figure 18A:
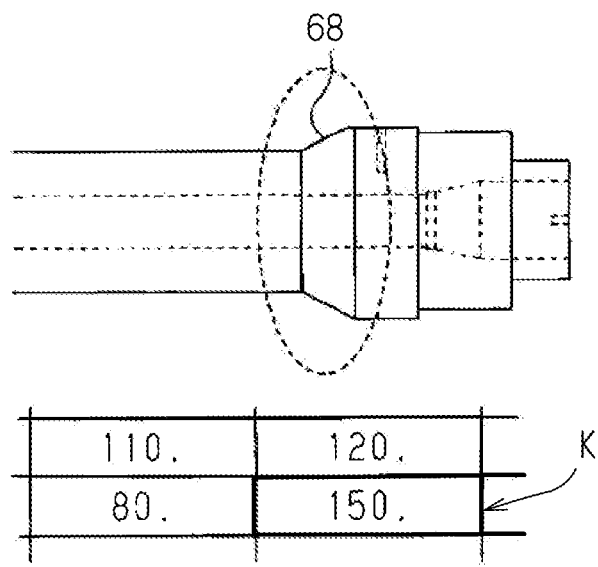
FIG. 18A and FIG. 18B are diagrams illustrating examples of images when data on a program data display area has been updated, in the first embodiment.
Figure 18B:
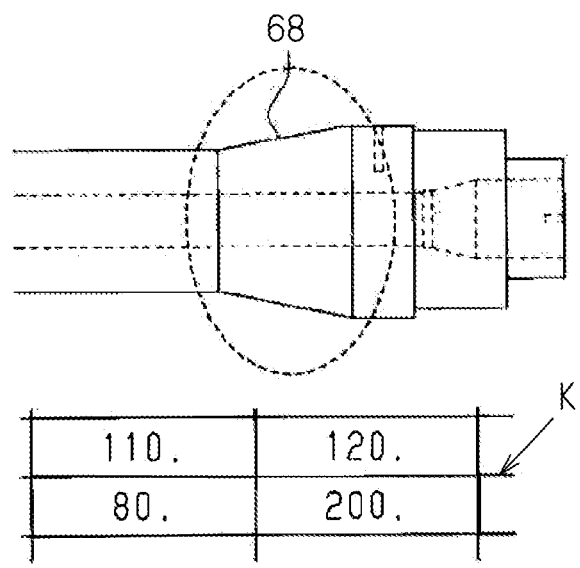

FIGS. 18A and 18B illustrate an example of the procedure shown in FIG. 17. FIG. 18A illustrates an example in which a numerical value that is designated by the cursor K and is changeable is "150". This numerical value corresponds to "termination point-Z" of the taper portion 68 in the product shape 60 shown in FIG. 4, (i.e., taper-portion smaller-diameter-side Z-axis coordinate values). FIG. 18B illustrates an example in which the numerical value "150" has been changed to a numerical value "200". In this case, on the shape display area 35b, the image shown in FIG. 18A is updated to an image in which the taper portion 68 has been changed. This processing is achieved by allowing the CPU 32 to recalculate a machined shape defined by the bar work machining unit corresponding to the unit number "4" and perform a set-difference operation on the recalculated machined shape and the material shape or any other shape. Incidentally, the position of the cursor K in FIG. 18B is different from that in FIG. 18A. This is because, in FIG. 18B, the cursor K has been moved upon settlement of the numerical value "200".

With these processes, a user is able to promptly grasp how the machined shape is to be changed by the change of data included in the machining program 40. Thus, the user is able to promptly notice a data input error or any other error.

It should be noticed that the procedures in FIGS. 12, 15, 16, and 17 are not processes that are executed only after the machining program 40 for machining the workpiece 10 into the product shape 60 has been input once. That is, even when the machining program 40 is in the curse of creation and is not completed as a program capable of machining the workpiece 10 into the product shape 60, the machining program 40 is executable. Thus, in the course of creation of the machining program 40, a user is able to promptly grasp what machined shape is provided as a result of newly input data.

Second Embodiment

Hereinafter, a second embodiment of the machining program editing assist apparatus will be described with a focus on differences with the first embodiment referring to the drawings.

Figure 19:
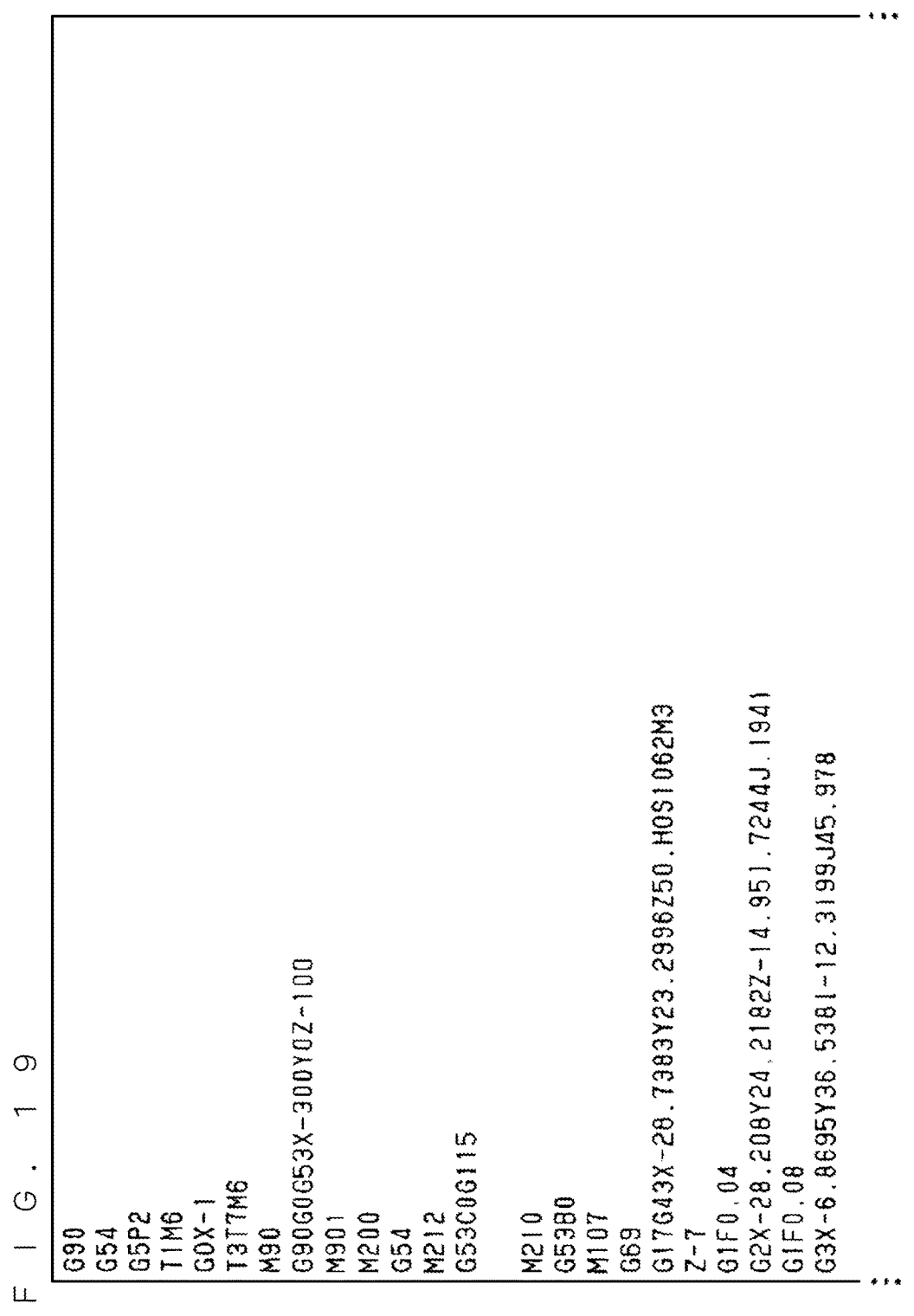

The machining program 40 according to this embodiment is a program conforming to EIA/ISO standards. FIG. 19 illustrates an example of the machining program 40 according to this embodiment.

As shown in FIG. 19, in this embodiment, the program is described using a G code and a T code each being an example of instruction codes prescribed by international standards EIA/ISO. Non-limiting examples of machining method data include the T code, an S code, and an F code. The T code is an example of tool replacement instruction codes, and instructs a tool for use in a cutting operation. The S code instructs a rotation number when a tool or a workpiece is caused to rotate. The F code instructs a relative movement speed between a tool and a workpiece in a cutting operation. Meanwhile, non-limiting examples of shape definition data include at least part of G codes and coordinate value data. The G code is an example of instruction codes each for defining a movement path of a tool. The coordinate value data indicates instructed position coordinate. As shown in FIG. 19, any code that represents only machining processes is not defined in the machining program 40 according to this embodiment. Thus, in the machining program editing assist apparatus according to this embodiment, a T code for instructing a tool for use in machining of the workpiece 10 is handled as a delimiter of a machining process, and this T code is handled as process name data.

Figure 20:
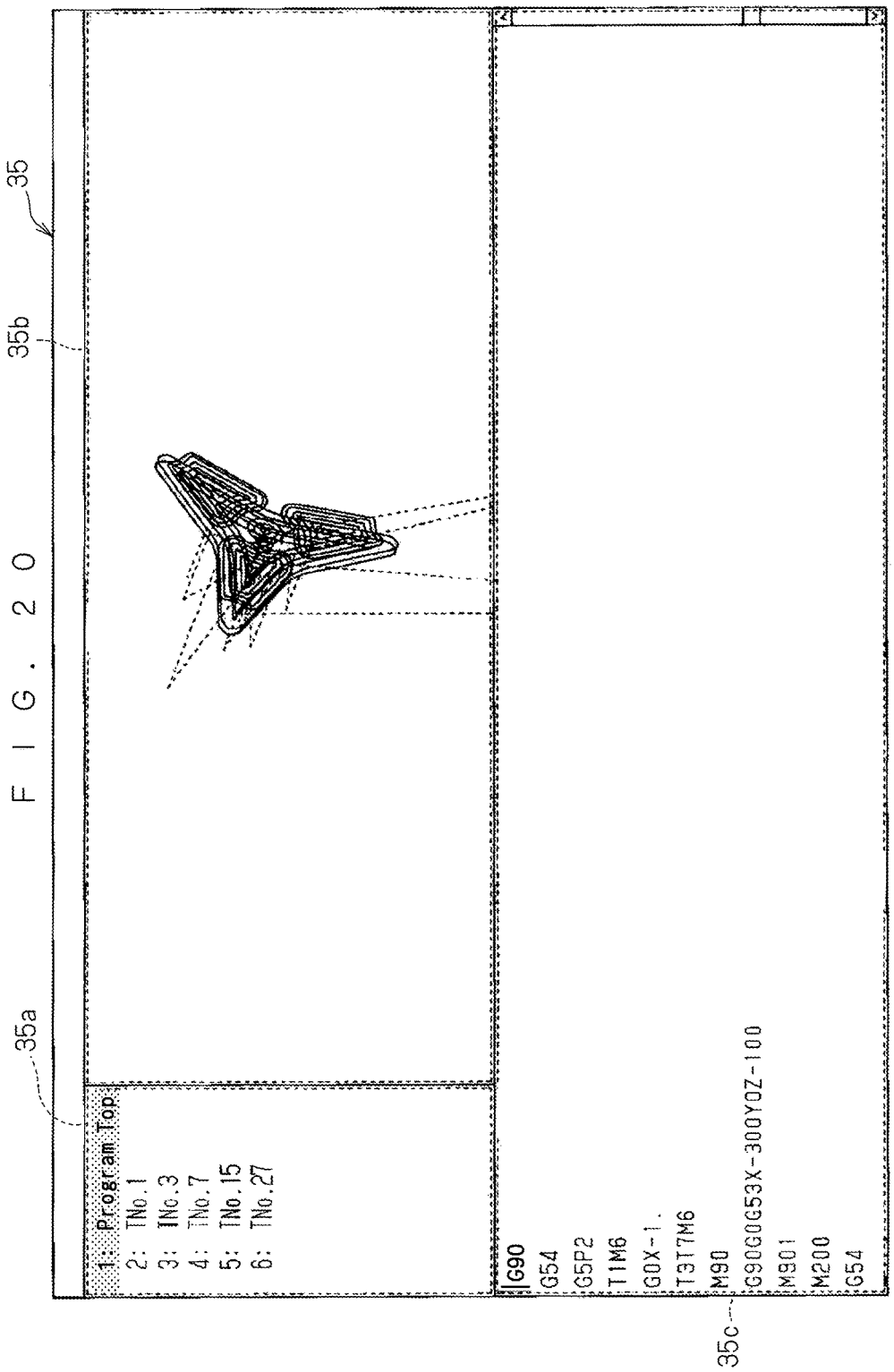
FIG. 20 is a diagram illustrating an example of an editing assistance image according to the second embodiment.

FIG. 20 illustrates an example of an editing assistance image according to this embodiment. As shown in FIG. 20, on the shape display area 35b, machined shapes specified by program instruction positions of a tool are displayed in full lines as machined shapes of the workpiece 10 that are examples of defined shapes, with respect to. Further, each of dashed lines inside the shape display area 35b corresponds to a movement path of the tool upon execution of a positioning instruction (which is also called a fast feed instruction), and is an example of the defined shapes. Each of the full line and the dashed line shown in FIG. 20 is an example of interconnection lines, and it is assumed that, actually, the forms of the two kinds of lines are the same (for example, full lines having the same line width) and the colors of the two kinds of lines are different from each other. In FIG. 20, however, because of restrictions on drawing on figures, the two kinds of lines are represented using the full line and the dashed line so as to be distinguished from each other. The display candidates of the program data display area 35c in FIG. 20 correspond to an example of program data, and are pieces of data (detailed data) describing the content of the machining program 40. That is, the pieces of detailed data are pieces of data representing the contents of machining processes described by the machining program 40. In this embodiment, the pieces of detailed data correspond to codes being other than an instruction code served as a delimiter for the machining processes, and including the G codes.

Figure 21:
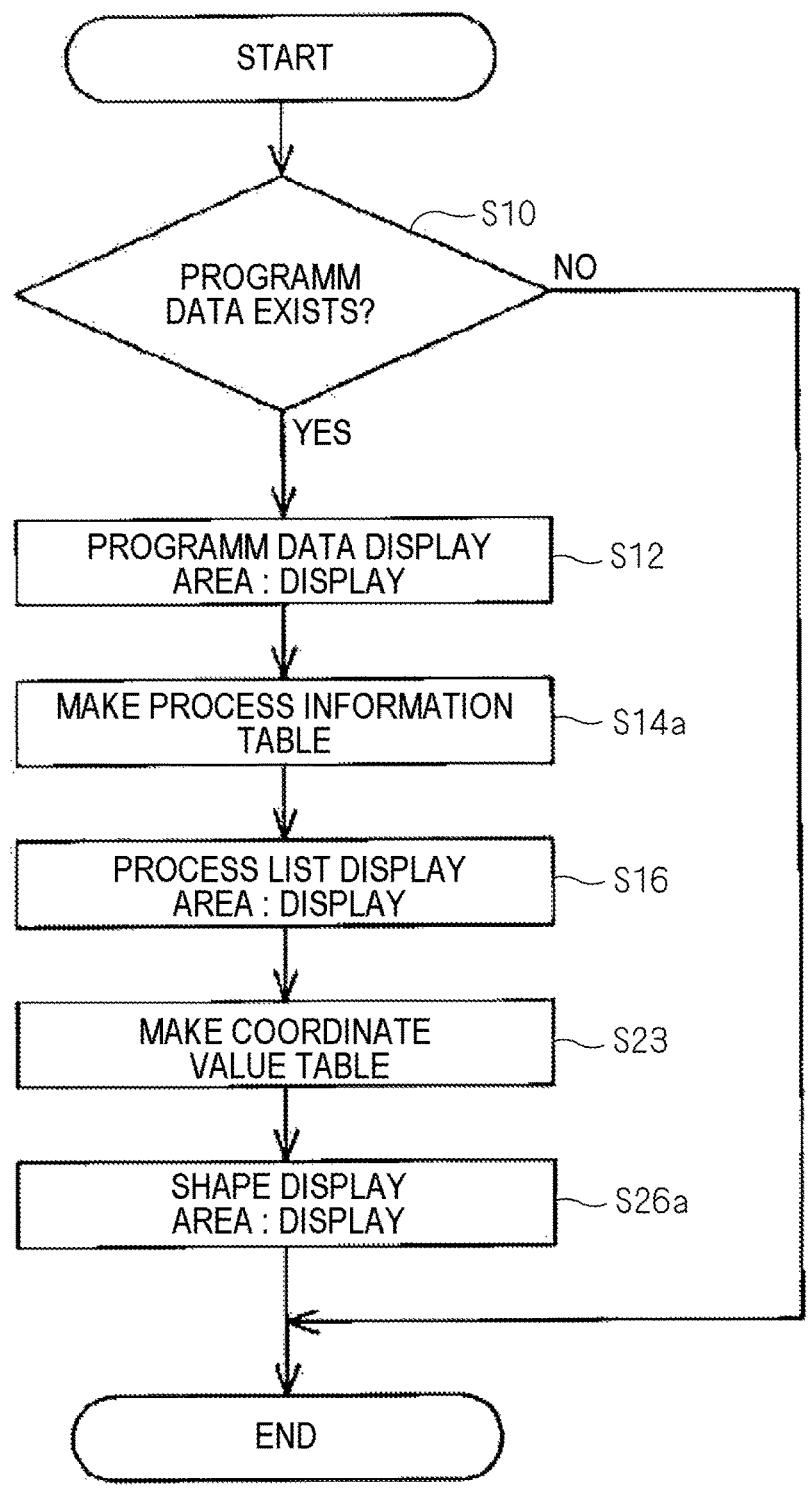
FIG. 21 is a flowchart illustrating a procedure of initial display processes according to the second embodiment.

FIG. 21 illustrates a procedure of displaying an editing assistance image shown in FIG. 20. It should be noted that, for the sake of convenience, in FIG. 21, processes each associated with a corresponding one of processes among the processes shown in FIG. 7 are denoted by step numbers identical to those of the processes among the processes shown in FIG. 7 so as to be omitted from description. The procedure shown in FIG. 21 constitutes control by the display control unit.

In this series of procedure, upon completion of a display process of displaying on the program data display area 35c in step S12, in step S14a, the CPU 32 extracts the T codes from the machining program 40 to create a process information table. In FIG. 22, the process information table is illustrated. The process information table is a table in which the T codes included in the machining program 40 are arranged in ascending order from a T code whose row number from the beginning of the program (hereinafter referred to as a program row number) is the smallest. In this regard, however, there is no T code corresponding to a process number "1". This process number "1" means the beginning of the program. In this embodiment, in the process information table created in such a way, operations performed in a block from a row corresponding to the beginning of a machining process up to a row immediately prior to a row corresponding to the beginning of a next machining process will be collectively referred to as a machining process. That is, the CPU 32 recognizes a block from a row containing a T code having been recognized as process name data up to a row immediately prior to a row containing a T code having been recognized next, as a machining process corresponding to the previously recognized T code.

The description is returned to FIG. 21 and, in step S16, the CPU 32 operates the display device 34 to allow character strings each indicating a T code to be displayed as machining processes on the process list display area 35a on the basis of the step information table. Here, as shown in FIG. 20, in a machining process name column corresponding to a process number "1", an indication "Program Top" is displayed so as to indicate that a position at which the indication "Program Top" is displayed is the top of the machining program 40.

Next, in step S23, the CPU 32 sequentially searches for the G codes from the beginning of the machining program 40 to extract, for each G code, a program row number, the kind of the each G code, and instructed position coordinate values, and then creates a coordinate value table on the memory 38. Coordinate values in a column of the coordinate value table having been created in such a way indicates termination-position coordinate values indicated by a G code corresponding to the coordinate values, that is, coordinate values of a point that defines a machined shape. Here, as a premise of drawing movement paths as the machined shape, the initial position is supposed to be located at a machine original point.

The description is returned to FIG. 21, upon completion of the creation of the coordinate value table, in step S26a, the CPU 32 displays a machined shape of the workpiece 10 on the shape display area 35b. Here, the CPU 32 first creates a 3D model over a three-dimensional virtual space by disposing coordinate points indicated by pieces of coordinate value data, and interconnection lines each interconnecting a pair of coordinate points among the coordinate points on the basis of coordinate values corresponding to rows from a first row to a last row of the coordinate value table, and then stores the created 3D model into the memory 38 as a machined shape model. Next, the CPU 32 converts the machined shape model into a two-dimensional graphic on the basis of a preset viewing point (that is, the CPU 32 projects the machined shape model onto a plane for display). Further, the CPU 32 displays the two-dimensional graphic on the shape display area 35b. Here, the points and the lines in the 3D model and the two-dimensional graphic have no magnitude, and thus, even when the graphic is enlarged, the line width of each of the lines does not become large. With respect to the interconnection lines created from the coordinate value table, a line interconnecting both a point indicated by a piece of coordinate value data corresponding to the beginning of the coordinate value table, and the machine original point, which is the initial position, is an interconnection line corresponding to the beginning of the coordinate value table. Further, subsequently created interconnection lines are lines each interconnecting both a coordinate point indicated by a piece of coordinate value data associated with a corresponding one of rows of the coordinate value table, and a coordinate point indicated by a piece of coordinate value data corresponding to a row immediately prior to the above corresponding one of the rows of the coordinate value table. In other words, an interconnection line indicated by a certain row of the coordinate value table is an interconnection line interconnecting a coordinate point indicated by a piece of coordinate value data corresponding to the certain row, and a coordinate point indicated by a piece of coordinate value data corresponding to a row immediately prior to the certain row, and it can be also said that the interconnection line is an interconnection line whose termination point is the coordinate point indicated by the piece of coordinate value data corresponding to the certain row.

The machined shape, which is displayed in the above processing, and is taken as an example of the defined shapes obtained by the machining program, is different from a machined shape obtained as a result of machining in a precise sense, but any machined shape obtained by the above simple and easy processing is sufficiently endurable to practical use. Further, for the machining program editing assist apparatus, since processing for creating a machined shape model is simple and easy, a time needed to complete the processing is significantly short, as compared with a conventional movement path display method in which an actual movement path of a tool is calculated and displayed, and thus, the machining program editing assist apparatus is suitable as an assistance function for specifying portions to be edited in a machining program. Further, the machined shape is a display candidate of the shape display area 35b, and any machined shape that becomes a display target is capable of being changed by changing a viewing point and a display magnification in the conversion into the two-dimensional graphic that is a graphic image.

Figure 24:
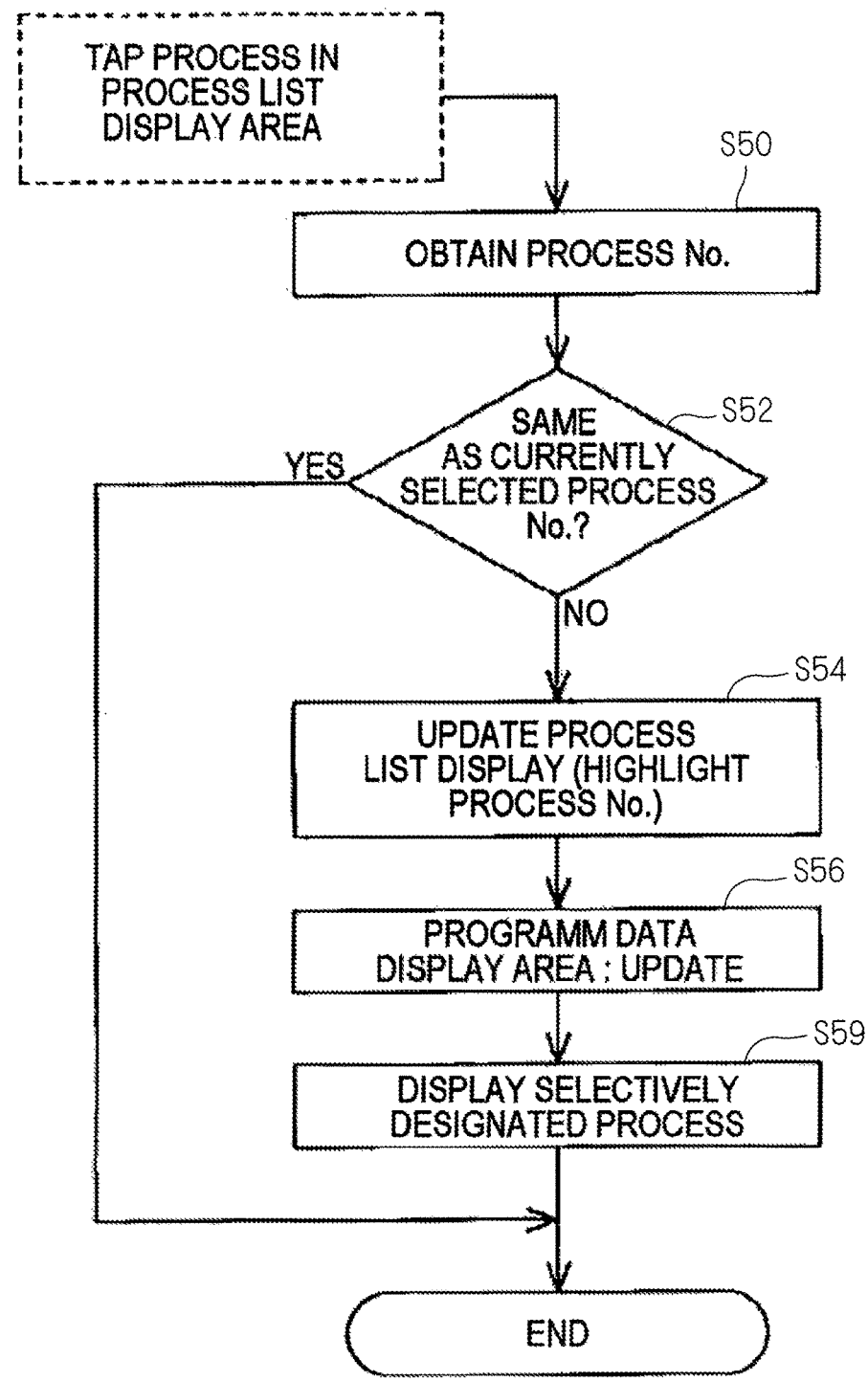
FIG. 24 is a flowchart illustrating a procedure when a portion on a process list display area has been tapped, in the second embodiment.

FIG. 24 illustrates a procedure in the case where a specific portion on the process list display area 35a is designated. The procedure shown in FIG. 24 is achieved by allowing the editing assist program 42 to be executed by the CPU 32. The procedure shown in FIG. 24 constitutes control by the display control unit. It should be noted that, for the sake of convenience, in FIG. 24, processes each associated with a corresponding one of processes among the processes shown in FIG. 15 are denoted by step numbers identical to those of the processes among the processes shown in FIG. 15 so as to be omitted from description.

In the procedure shown in FIG. 24, upon the completion of the process of step S56, the CPU 32 selectively displays a machined shape of a designated machining process as a designated display target on the shape display area 35b (S59).

FIG. 25A illustrates a state in which a machining process "TNo.3" corresponding to a process number "3" is tapped on the process list display area 35a", and FIG. 25B illustrates a state in which only a machined shape for the machining process "TNo.3", corresponding to the process number "3", is selectively displayed. Specifically, the CPU 32 first erases the screen of the shape display area 35b, and then obtains a start program row number and an end program row number that correspond to the process number "3" from the process information table. Further, the CPU 32 obtains pieces of data from the start program row number up to the end program row number to perform a machined shape display of only the machined shape corresponding to the process number "3." That is, in the case where a user designates a machining process displayed on the process list display area 35a and the CPU 32 has specified the machining process, as a result, the CPU 32 allows, on the shape display area 35b, all pieces of program data included in the specified machining process to be selected to allow a defined shape corresponding to the selected pieces of program data to be handled as a designated display target. This processing is referred to as overall row processing. Meanwhile, there is provided another processing which will be described later and in which, on the program data display area 35c, a first row of the machined process having been specified by the CPU 32, that is, a row having been recognized as a piece of process name data, is handled as a designated display target, and when this row is already displayed, the cursor is caused to move to this row to indicate that this row is the designated display target.

In FIG. 25B, pieces of detailed data included in the machining program 40 and having been displayed as a display target on the program data display area 35c after the completion of the process of step S56 are illustrated, and these pieces of detailed data are the same as pieces of detailed data included in the machining program 40 and displayed as a display target on the program data display area 35c in FIG. 25A, and only the cursor K is moved. This is an example in which even if pieces of detailed data included in the machining program 40 and displayed on the program data display area 35c are not changed, data describing the selected machining process is enabled to be displayed, and thus, the beginning of the pieces of detailed data setting has not been set to the display start position of the program data display area 35c. Incidentally, the cursor K is displayed at a row at which "T3T7M6" is described. Here, a left-hand side T code "T3" is a piece of data indicating a tool to be used in a machining operation this time, and a right-hand side T code "T7" is a piece of data indicating a tool to be used in a machining operation next time. A row at the beginning of which a character string whose initial characters are "T7" appears exists in later rows of the machining program 40, and this row prescribes the machining operation using the tool indicated by the piece of data corresponding to the T code "T7". In FIG. 25B, the cursor K is moved to the row at which "T3T7M6" is described to indicate that this portion has been made a designated display target.

Figure 26B:
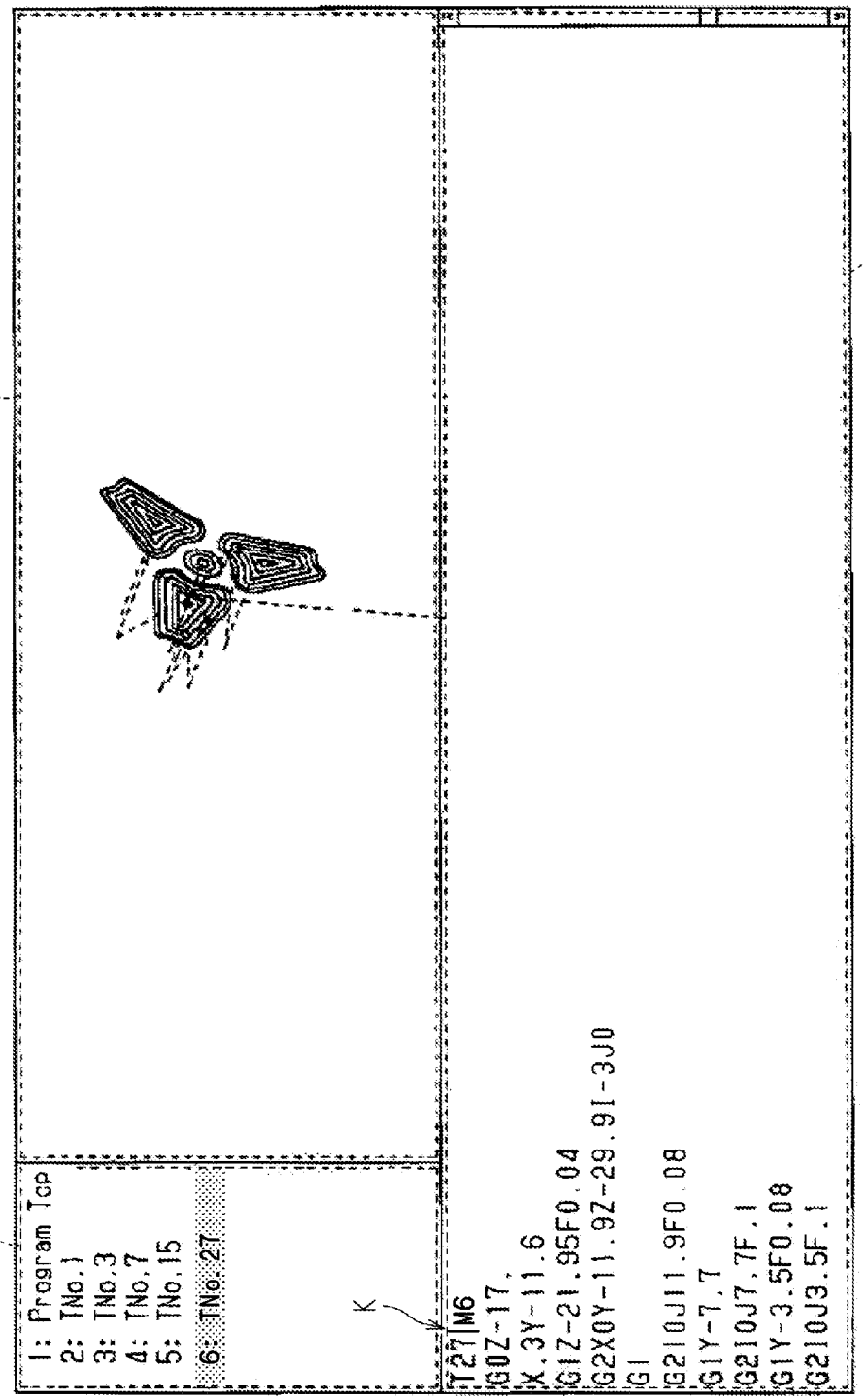

FIG. 26A illustrates a state in which a machining process "TNo.27" corresponding to a process number "6" is tapped on the process list display area 35a, and FIG. 26B illustrates a state in which only a machined shape for the machining process "TNo.27" corresponding to the process number "6" is selectively displayed on the shape display area 35b. In this case, pieces of detailed program data displayed on the program data display area 35c in FIG. 26B are different from pieces of detailed program data displayed on the program data display area 35c in FIG. 26A as a result of an operation of setting the beginning of the pieces of detailed program data shown in FIG. 26A to the display start of the program data display area 35c.

According to the procedure shown in FIG. 24, a user is able to, by tapping one of machining processes displayed on the process list display area 35a, promptly grasp a machined shape for the designated machining process through an image on the shape display area 35b. Further, the user is able to promptly grasp data describing the machining process though pieces of detailed data included in the machining program 40 and displayed on the program data display area 35c. In both of the descriptions for FIGS. 25A, 25B, 26A, and 26B, when, in a state in which machined shapes for a specified machining process are already displayed, a machining process has been specified, display targets other than the designated display target are erased and only the designated display target is displayed. Meanwhile, when, in a state in which, for example, because of the change of a viewing point for the purpose of a conversion into a two-dimensional graphic, that is, a graphic image, any machined shape for a specified machining process is not displayed, a machining process has been specified, a magnification for the two-dimensional graphic is changed in accordance with the size of the shape display area 35b, and the designated display target is displayed at the center the shape display area 35b through a parallel movement of a viewing point.

Figure 27:
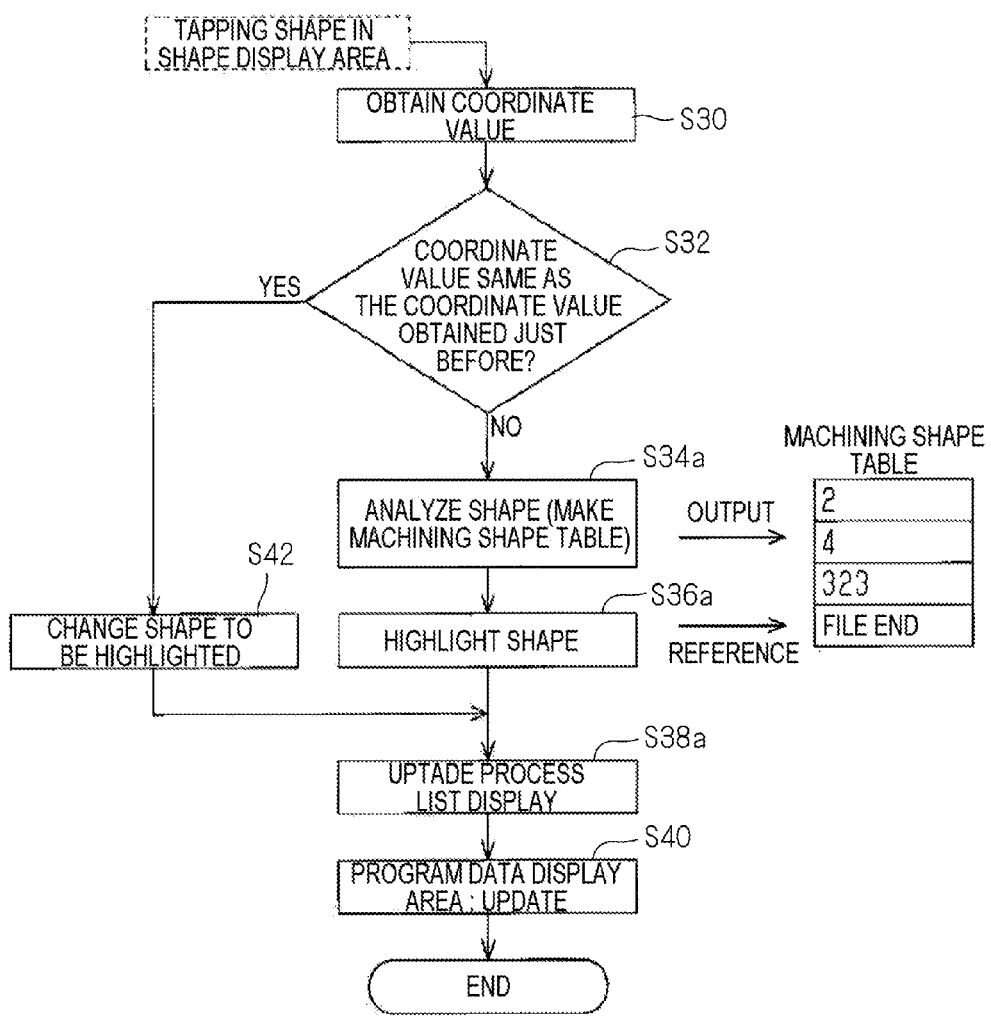
FIG. 27 is a flowchart illustrating a procedure when a portion on a shape display area has been tapped, in the second embodiment.

FIG. 27 illustrates a procedure in the case where a specific portion on the shape display area 35b is designated. The procedure shown in FIG. 27 is achieved by allowing the editing assist program 42 to be executed by the CPU 32. The procedure shown in FIG. 27 constitutes control by the display control unit. It should be noted that, for the sake of convenience, in FIG. 27, processes each associated with a corresponding one of processes among the processes shown in FIG. 12 are denoted by step numbers identical to those of the processes among the processes shown in FIG. 12 so as to be omitted from description.

As shown in FIG. 27, the CPU 32 creates a machined shape table in step S34a. That is, when a specific portion on the shape display area 35b is tapped, the CPU 32 extracts lines existing within a region inside a circle having a radius of a predetermined size and having a center coincident with the specific point in a two-dimensionalized machined shape model displayed on the shape display area 35b, on the basis of output values from the touch panel 36. This is a process performed to deem that the region inside the circle has been designated as a specific portion in view of a configuration in which a machined shape displayed on the shape display area 35b is a line in this embodiment. Further, an original program row number of a program in which the extracted line has been created is obtained on the basis of the coordinate value table shown in FIG. 23. Further, a machined shape table is created by enumerating the obtained program row number. In this case, instead of the coordinate value table, a method that, when a line is displayed on the shape display area 35b, allows the displayed line and a program row number to be stored in the memory 38 in the form of a set in advance may be employed. This method enables obtaining of the program row number more promptly.

Further, in step S36a, the CPU 32 operates the display device 34 to, on the shape display area 35b, allow a machined shape (an interconnection line) determined by a first piece of data among the program row numbers enumerated in the machined shape table, that is, a machined shape (an interconnection line) registered at the beginning of the machined shape table, is displayed in a highlighted manner as a designated display target. That is, for only the relevant portion, a color is changed, or a line width is made larger. Next, in step S38a, the CPU 32 operates the display device 34 to, on the process list display area 35a, allow a machining process including a relevant program row number to be searched for on the basis of the process information table, and then, a character string corresponding to a process number of an obtained machining process is displayed in a highlighted manner as a designated display target. Moreover, in step S40, the CPU 32 operates the display device 34 to, on the program data display area 35c, allow the beginning of pieces of detailed data included in a relevant program to be set to the display start position of the program data display area 35c as a designated display target, and allow the cursor to be moved to a relevant row, that is, a row indicated by the program row number included in the machined shape table and having been employed as a designated display target on the shape display area 35b.

According to the procedure shown in FIG. 27, when a user has felt that there is a portion that the user is concerned about in a machined shape displayed on the shape display area 35b, the user is able to, by tapping the portion, promptly grasp which portion of the entire machining processes a machining process in which the machined shape is machined corresponds to. Further, the user is able to promptly grasp the content of the program through the pieces of detailed data which are included in the machining program 40 and the beginning of which has been set to the display start position of the program data display area 35c. Further, in the case where the same portion is repeatedly machined using a large number of tools, there occurs a case where machined shapes are so intricate that the machined shapes are difficult for a user to identify by which of tools each of the machined shapes is machined. In such a case, the user is also able to quickly identify a targeted machined shape by tapping a process number or a tool name on the process list display area 35a to allow machined shapes related to only a machining process corresponding to the targeted machined shape to be displayed once, and then by tapping the shape display area 35b.

Figure 28:
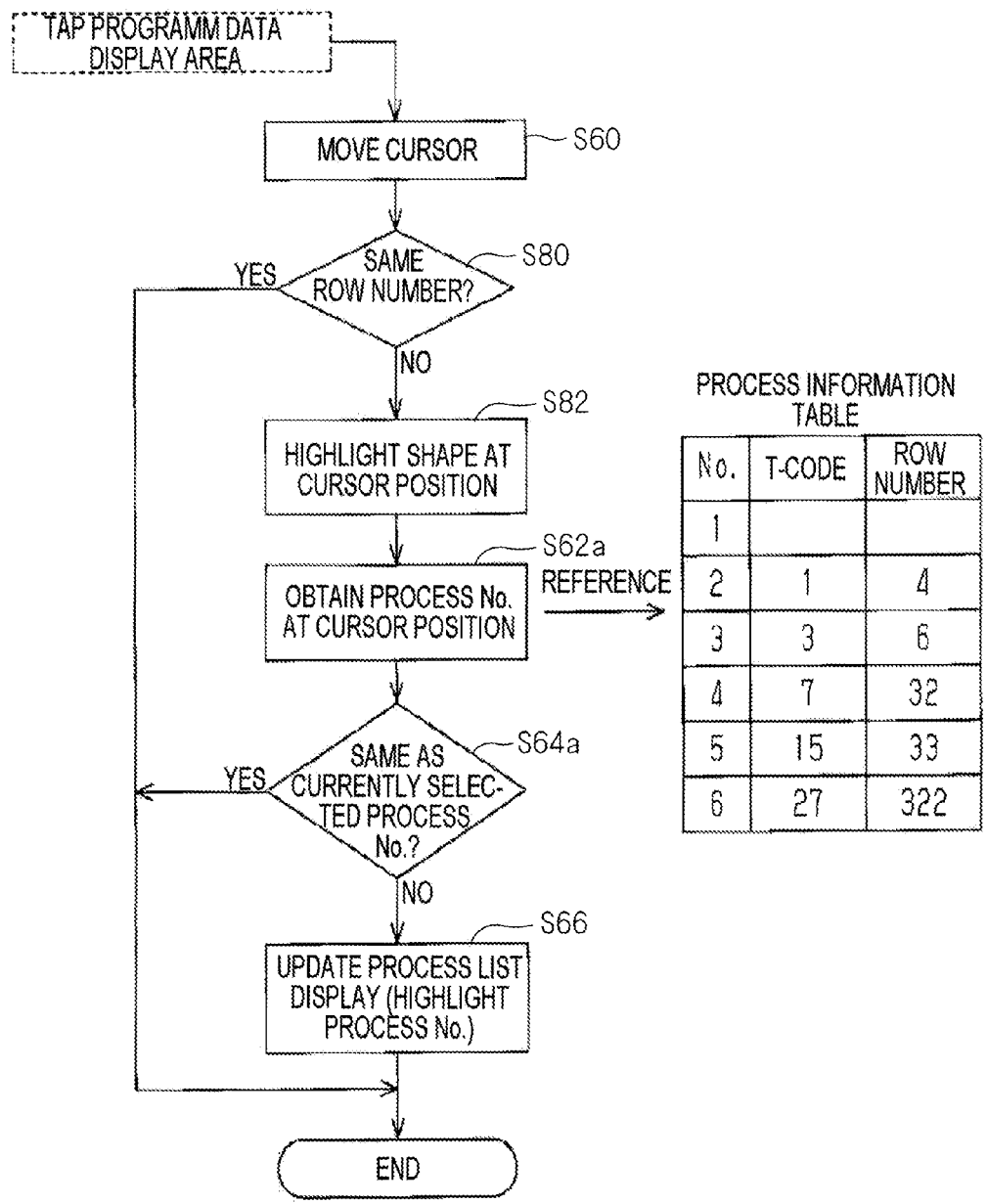
FIG. 28 is a flowchart illustrating a procedure when a portion on a program data display area has been tapped, in the second embodiment.

FIG. 28 illustrates a procedure in the case where a specific portion on the program data display area 35c is designated. The procedure shown in FIG. 28 is achieved by allowing the editing assist program 42 to be executed by the CPU 32. This procedure constitutes control by the display control unit. It should be noted that, for the sake of convenience, in FIG. 28, processes each associated with a corresponding one of processes among the processes shown in FIG. 16 are denoted by step numbers identical to those of the processes among the processes shown in FIG. 16.

Upon completion of the process of step S60, in step S80, the CPU 32 determines whether or not a program row number corresponding to the position of the cursor is the same as an immediately previous program row number. In the case where the CPU 32 has determined that the cursor has been moved to a program row number different from the immediately previous program row number (S80: NO), the CPU 32 determines a machined shape (an interconnection line) determined by the program row number at which the cursor is positioned, as a designated display target on the shape display area 35b, and displays the machined shape (the interconnection line) in a highlighted manner (S82). Next, the CPU 32 obtains a process number corresponding to the program row number at which the cursor is positioned, on the basis of the process information table (S62a). That is, program row numbers each associated with a program row number of the beginning of a corresponding one of the machining processes are described on the process information table, and thus, the process number is capable of being obtained on the basis of this description. For example, in the case where a program row number corresponding to the cursor position is "8", the program row number is larger than a program row number "6" corresponding to a process number "3", and is smaller than a program row number "32" corresponding to a process number "4", and thus, a process number corresponding to the program row number is identified to be "3".

Further, the CPU 32 determines whether or not the process number having been identified in step S62a corresponds to a currently selected process number (S64a). Further, in the case where the CPU 32 has determined that the process number having been identified in step S62a does not correspond to the currently selected process number (S64a: NO), the CPU 32 updates the display on the process list display area 35a (S66).

According to the procedure shown in FIG. 28, a user is able to, by tapping a character string corresponding to any piece of data among pieces of detailed data included in the machining program 40 and displayed inside the program data display area 35c, promptly grasp which of machining processes the relevant piece of data corresponds to through a highlighting display on the process list display area 35a. Further, the user is able to promptly grasp a machined shape determined by the relevant data through a highlighted display on the shape display area 35b.

Other Embodiments

The above embodiments may be changed and practiced as described below.

"Regarding a Display Method for Displaying a Designated Display Target"

In FIGS. 13A and 13B, FIGS. 26A and 26B, and any other figure, a method that, on the process list display area 35a, allows the color of a designated display target to be changed and allows the brightness of the designated display target to be increased is exemplified, but the present invention is not limited to this method. For example, the brightness may be increased without the change of the color. Further, for example, the color may be changed without the increase of the brightness.

In FIGS. 13A and 13B, FIGS. 26A and 26B, and any other figure, on the program data display area 35c, the beginning of designated display targets is set to the display start position of the program data display area 35c and the cursor K is caused to move to a specific portion of the designated display targets, but the present invention is not limited to this method. For example, at the time immediately after the beginning setting has been made, the position of the cursor K may not be defined and the cursor K may not displayed. In this case, for example, when a specific character string or any other display target inside the program data display area 35c has been tapped, the cursor K may be caused to appear on the relevant portion.

In FIGS. 13A, 13B, 14A, and 14B, on the shape display area 35b, a machined shape is displayed in a highlighted manner, but the present invention is not limited to this method. Instead of such display in a highlighted manner, for example, color may be changed. Further, for example, an arrow pointing at a highlighting display portion may be displayed in addition to the highlighting display. Further, for example, only the arrow may be displayed without the highlighting display.

In FIG. 24, when a specific machining process is designated, the CPU 32 selectively displays only a machined shape to be machined through the designated machining process, on the shape display area 35b, but the present invention is not limited to this method. For example, only the machined shape to be machined through the designated machining process may be displayed in a highlighted manner. Further, for example, for only the machined shape to be machined through the designated machining process, its color may be changed and displayed.

In FIGS. 15 and 16, when a specific machined process is designated, the CPU 32 displays a machined shape to be machined through the specific machining process on the shape display area 35b in a highlighted manner, but the present invention is not limited to this method. For the example, only the specific machined shape may be displayed in a full line and may be otherwise displayed in a dashed line. Further, for example, the specific machined shape may be otherwise caused not to be displayed.

"Regarding a Specification Method for Specifying a Designated Display Target"

In FIGS. 12 and 27, candidates for a designated display target are registered into the machined shape table in ascending order of process numbers of machining processes and each of the registered candidates is sequentially selected as the designated display target from the beginning of the machined shape table, but the present invention is not limited to this method. For example, candidates for a designated display target may be registered into the machined shape table in descending order of process numbers of machining processes and each of the candidates may be sequentially selected as the designated display target from the beginning of the machined shape table.

In the procedure shown in FIG. 27, in a two-dimensionalized machined shape model displayed on the shape display area 35b, a line existing inside a circle having a radius of a predetermined size and having a center coincident with a designated point is specified as a display candidate designated by a user, but the present invention is not limited to this method. For example, pieces of data for specifying a display candidate having been designated by a user may be created in advance on the basis of data displayed on the shape display area 35b so as to serve as pieces of data prescribing regions each serving as a line width of a predetermined size and associated with a corresponding one of lines displayed on the shape display area 35b. Further, a line corresponding to a region constituting the regions and including a designated point having been designated by a user may be specified as a display candidate designated by the user.

"Regarding Division into Display Areas"

In the above embodiments, the region size and the arrangement coordinate values of each of the process list display area 35a, the shape display area 35b, and the program data display area 35c are supposed to be fixed, but the present invention is not limited to this configuration. For example, the designation of the enlargement or the reduction of a specific region itself may be enabled by a pinch-in operation, a pinch-out operation, or any other operation on the touch panel 36. With this configuration, for example, when, in order to enlarge the process list display area 35a and the shape display area 35b, an instruction for instructing the enlargement of these two display areas in a direction toward the lower portion of FIG. 6 is issued, the program data display area 35c is reduced and the process list display area 35a and the shape display area 35b are enlarged. In this case, it is not essential that all of the process list display area 35a, the shape display area 35b, and the program data display area 35c are always displayed within the screen 35. For example, the enlargement of the process list display area 35a and the shape display area 35b may enable the display of the program data display area 35c to be disabled. In this case, it is sure that pieces of information displayed on the individual display areas are enabled to be easily associated with one another by enabling the display of the program data display area 35c as needed.

"Regarding a Shape Creation Processing Unit"

In the first embodiment, a defined shape to be displayed on the shape display area 35b is created on the basis of a set difference with respect to shapes (pieces of coordinate information) prescribed by pieces of shape sequence data (FIG). Further, in the second embodiment, a defined shape is created by interconnecting pairs of points over a space that are among points defined by a plurality of pieces of coordinate value data having been set in the machining program 40 so as to allow the interconnection to be performed using lines each having an attribute determined by a G code. The shape creation method, however, is not limited to such a method that allows data for use in forming a machined shape to be displayed on the shape display area 35b to be generated on the basis of a set difference based on coordinate information prescribed by a machining program or line interconnection processing. For example, the machining program 40 is converted into codes used by the numerical control device 30 to execute simulation of machining of the workpiece 10, and shapes obtained from data generated through the simulation may be handled as defied shapes to be displayed on the shape display area 35b. In this case, the storage of data at the time of completion of each of machining processes among resultant data of the simulation enables images of workpiece shapes for the respective machining processes to be displayed on the shape display area 35b.

"Regarding a Machining Program"

The machining program including machining method data and shape definition data is not limited to the program including the two kinds of data exemplified in FIGS. 2 and 3. For example, the machining program may be a program that, for each of point machining, line machining, and face machining, includes a plurality of removed shape units defining removed shapes independently of tools, and that, independently of the removed shape units, includes data (tool units) each capable of being combined with one or more of the removed shape units. In this case, the tool sequence data, which is shown in the first embodiment and in which tools and cutting conditions are input, is an example of the machining method data. The machining program may be created by describing a unit prescribing a tool after a unit defining a removed shape.

"Regarding a Program Editing Assist Device"

All functions implemented in the editing assist program 42 are not executed by the CPU 32. For example, in the above embodiments, at least part of the functions achieved by allowing the editing assist program 42 to be executed by the CPU 32 may be achieved by a dedicated hardware means.

"Regarding a Target of Installation of an Editing Assist Program"

The target of installation of the editing assist program is not limited to the numerical control device 30, and may be, for example, a general-purpose computer.

"Regarding a Machining Tool"

The composite machining machine is not limited to the composite machining machine exemplified in the above embodiments. For example, a composite machining machine that includes a function, such as the function of a lath, that allows the workpiece 10 to be cut in a state in which the workpiece 10 is kept rotating, and that does not include a function, such as the function of a miller, allows a rotating tool to machine the workpiece 10 being fixed.

"Regarding an Input Device"

The input device is not limited to the touch panel 36. The input device may be a device, such as mouse, that is capable of designating a specific portion on a display area. In this case, the specific portion is not limited to a point, but may be a region having a width. In this regard, however, when a specific portion inside the process list display area 35a or the program data display area 35c is designated, it is preferable that a machining process image or a data image that includes part of the specific portion is deemed to have been designated.

The device disclosed in Japanese Unexamined Patent Publication No. H3-94307 is merely configured to, every time an analysis of one block is completed, display a shape corresponding to the analysis. Thus, for example, for a shape obtained upon completion of all analyses of a machining program, in order to know which portion of the machining program a program for machining a specific portion of the shape corresponds to, a user needs to grope for the portion. Further, for example, even when, after an overall review of the machining program, a question about what shape is obtained through a machining process prescribed by a specific program of the machining program has arisen in a user's mind, the user is not able to immediately grasp the shape.

Hereinafter, means for solving the disadvantages found in the background art and operation effects of the means will be described.

Aspect 1: a machining program editing assist apparatus includes a display device, an input device configured to allow any point on a screen of the display device to be designated, a display control unit configured to divide the screen into at least two display areas and control display on a program data display area and a shape display area among the display areas, and a machining program being for use in a machining tool and comprising program data that includes data sectioned for each of at least one machining process and that includes machining method data defining a method of machining in the each of at least one machining process, and shape definition data defining a shape contributing to the machining in the each of at least one machining process. The display control unit is configured to handle the program data as a display candidate of the program data display area to allow at least one portion of the program data to be displayed on the program data display area as a display target of the program data display area, and handle defined shapes obtained from the shape definition data as a display candidate of the shape display area to allow at least one portion of the defined shapes to be displayed on the shape display area as a display target of the shape display area The shape definition data includes a set of material shape data defining a shape of a material, and at least one set of removed shape data each defined for a corresponding one of the at least one machining process and defining a shape to be removed by execution of the corresponding one of the at least one machining process, and the defined shapes includes at least one removed shape and workpiece shapes. The display control unit is configured to, when, in a state in which the display target of the shape display area is displayed on the shape display area, a specific portion on the shape display area is designated via the input device, register a removed shape included in the at least one removed shape and comprising the specific portion included inside the removed shape into a machined shape table in which at least one candidate for the designated display target of the shape display area is registered, allow a designated display target candidate registered at a beginning of the machined shape table to be displayed as a designated display target of the shape display area so as to be differentiated from any other display target of the shape display area, and allow at least one portion of data being among at least one display candidate of the program data display area and sectioned by a machining process constituting the at least one machining process and corresponding to the designated display target of the shape display area to be displayed as a designated display target of the program data display area on the program data display area in a state in which a beginning of the at least one portion of data is set to a display start position of the program data display area. The display control unit is configured to, when a portion whose distance to the specific portion is smaller than or equal to a predetermined length is successively designated via the input device, allow a next designated display target candidate to be displayed, in order of the registration into the machined shape table, as a designated display target of the shape display area on the shape display area so as to be differentiated from any other display target of the shape display area.

The above display control device performs the following control. That is, when a specific portion on the shape display area is designated via the input device, the display control unit specifies a defined shape that is a display candidate specified by the specific portion and a defined shape displayed on the shape display area, as a designated display target of the shape display area, and allows the defined shape to be displayed so as to be differentiated from any other display target. Further, the display control unit specifies program data corresponding to the defined shape, which is the designated display target of the shape display area, as a designated display target of the program data display area, and allows the program data to be displayed on the program data display area in a state in which a beginning of the at least one portion of data is set to a display start position of the program data display area.

Accordingly, this configuration enables a user to understand a defined shape displayed on the shape display area and program data displayed on the program display area in a way that allows the defined shape and the program data to be associated with each other. Accordingly, this configuration assists the editing of the machining program in a more suitable manner. In the case where, on the two-dimensional screen of the display device, a specific portion on the shape display area is designated through the input device, a plurality of defined shape candidates specified from the specific portion may exist among display candidates. Thus, in the above device, a plurality of candidates are registered into the machined shape table. Further, every time a portion whose position is close to that of an immediately designated portion on the shape display area is designated, a next designated display target candidate is displayed as a designated display target of the shape display area in order of the registration into the machined shape table. With this configuration, a user is able to obtain information in relation to his or her intended defined shape.

Aspect 2: in the machining program editing assist apparatus according to aspect 1, each of the at least one removed shape may include a shape defined by a corresponding one of the at least one set of removed shape data, and one of the workpiece shapes before execution of the machining program may be defined by the set of material shape data. One of the workpiece shapes after one of the at least one machining process may include a shape obtained by performing a set-difference operation on another one of the workpiece shapes before execution of the one of the at least one machining process and one of the at least one removed shape corresponding to the one of the at least one machining process. The designated display target of the shape display area may include the at least one removed shape each specified for a corresponding one of the at least one machining process. The display control unit may be configured to allow one of the workpiece shapes before execution of a machining process which is one of the at least one machining process and for which one of the at least one removed shape having been selected as the designated display target of the shape display area is defined, and the one of the at least one removed shape, having been selected as the designated display target of the shape display area, to be superimposed on each other and displayed to allow the designated display targets of the shape display area to be differentiated.

The above display control unit allows a removed shape corresponding to a machining process to be displayed so as to be differentiated from a workpiece shape immediately before the machining process. The removed shape corresponding to each of machining processes represents the feature of the machining process, and thus, a user is able to, from a removed shape displayed on the screen, instantly grasp which of the machining processes included in the machining program a machining process corresponding to the removed shape corresponds to. As a result, the user is able to instantly and correctly determine whether or not the machining process having been specified as the designated display target is a machining process to be edited from now, and thus, the user is able to quickly identify his or her desired portion of the machining program. Further, the workpiece shape becomes closer to its product shape along with the progress of the machining processes, and thus, the user is able to intuitively grasp the progress of the machining processes from a workpiece shape having been displayed on the screen.

Aspect 3: in the display control unit according to aspect 2, the above display control unit may be configured to, when partial program data constituting the program data and displayed on the program data display area is changed into another partial program data constituting the program data, change one of the at least one removed shape displayed on the shape display area into another one of the at least one removed shape corresponding to the another partial program data, and allow the another one of the at least one removed shape to be displayed on the shape display area.

According to the above machining program editing assist apparatus, a user is able to confirm the change of a removed shape in accordance with input data or edited data during a creation work for creating a machining program or an editing work for editing the machining program. For example, even when erroneous data has been input or erroneous data has been edited, a user is able to notice the error during a creation work for creating a machining program or an editing work for editing the machining program. Thus, even when a user who handles the machining program is a beginner, this configuration eliminates or minimizes his or her hesitation in a data input work and a data editing work.

Aspect 4: in the machining program editing assist apparatus according to aspect 1, the machining method data may include sets of machining method data each associated with a corresponding one of the at least one machining process, and may include at least one set of process name data each indicating a process name of a corresponding one of the at least one machining process. The display control unit may further provide, on the screen, a process list display area whose display candidate is the at least one set of process name data, and may be configured to allow at least one portion of the at least one set of process name data to be displayed on the process list display area as a display target of the process list display area. The display control unit may be configured to, when, in a state in, on one display area that is any one of the program data display area, the shape display area, and the process list display area, a display target that is the display target of the program data display area, the display target of the shape display area, or the display area of the process list display area, whichever is associated with the one display area, is displayed, a specific portion on the one display area is designated via the input device, allow a display candidate specified by the specific portion and the display target of the one display area to be displayed as a designated display target of the one display area so as to be included in at least one display target of the one display area and be differentiated from any other display target of the one display area, and allow display candidates each of which is among at least one display candidate of a corresponding one of two display areas other than the one display area among the program data display area, the shape display area, and the process list display area, and each of which corresponds to the designated display target of the one display area to be displayed as designated display targets of the two display areas so as to be each included in at least one display target of a corresponding one of the two display areas and be each differentiated from any other display target of the corresponding one of the two display areas.

In the above device, when a display target on a process list is designated, a defined shape corresponding to the display target is displayed, and thus, a user is able to easily grasp a removed shape and any other defined shape in each of a plurality of mutually different machining processes. Particularly, when the size of the machining program is large, it is difficult for the user to overview the whole content of the machining program through the program data display area, thus the above configuration is effective. Further, providing the process list display area on the screen enables the user to promptly grasp the relationships among the machining processes, the data of the machining program, and the shapes machined through the machining processes.

Aspect 5: a machining program editing assist apparatus includes a display device, an input device configured to allow any point on a screen of the display device to be designated, a display control unit configured to divide the screen into at least two display areas and control display on a program data display area and a shape display area among the display areas, and a machining program being for use in a machining tool and comprising program data that includes data sectioned for each of at least one machining process and that includes machining method data defining a method of machining in the each of at least one machining process, and shape definition data defining a shape contributing to the machining in the each of at least one machining process. The display control unit is configured to handle the program data as a display candidate of the program data display area to allow at least one portion of the program data to be displayed on the program data display area as a display target of the program data display area, and handle defined shapes obtained from the shape definition data as a display candidate of the shape display area to allow at least one portion of the defined shapes to be displayed on the shape display area as a display target of the shape display area. The shape definition data defines shape instruction codes for each of code rows of the shape instruction codes and in order of execution of the shape instruction codes, and the shape instruction codes includes pieces of coordinate value data defining a movement path of a tool of the machining tool. The defined shapes include interconnection lines each of which sequentially interconnects, in accordance with the machining program, a pair of coordinate points among coordinate points each specified by a corresponding one of the pieces of coordinate value data, which are included in the shape instruction codes defined for each of the code rows. The display control unit is configured to, when, in a state in which the display target is displayed on the shape display area, a specific portion on the shape display area is designated via the input device, register one of the interconnection lines which is a display target, and at least one portion of which is included in a predetermined area whose center is located at the specific portion, into a machined shape table as a candidate for the designated display target of the shape display area, and allow a designated display target candidate registered at a beginning of the machined shape table to be displayed on the shape display area as a designated display target differentiated from any other display target by allowing a line representing an interconnection line serving as the designated display target to be different, in at least one of a line type, a line width, and a color, from a line representing any other interconnection line serving as the any other display target. The display control unit is configured to allow at least one portion of data being among at least one display candidate of the program data display area and sectioned by a machining process constituting the at least one machining process and corresponding to the designated display target of the shape display area to be displayed as a designated display target of the program data display area on the program data display area in a state in which a beginning of the at least one portion of data is set to a display start position of the program data display area. The display control unit is configured to, when a portion whose distance to the specific portion is smaller than or equal to a predetermined length is successively designated via the input device, allow a next designated display target candidate of the machined shape table to be displayed as a designated display target of the shape display area on the shape display area in order of the registration into the machined shape table so as to be differentiated from any other display target of the shape display area.

According to the above machining program editing assist apparatus, in a machining program in which a movement path of a tool is defined by instruction codes, this configuration enables a user to understand a defined shape displayed on the shape display area and program data displayed on the program display area, in a way that allows the defined shape and the program data to be associated with each other.

According to the above machining program editing assist apparatus, even when a defined shape is not a closed shape, a next designated display target candidate is displayed as a designated display target of the shape display area in order of the registration into the machined shape table, and thus, a user is able to obtain information in ration to his or her intended defined shape. Further, even when a plurality of defined shapes each having an open shape are jumbled together in an area adjacent to the specific portion, a user is able to obtain information in ration to his or her intended defined shape.

Aspect 6: in the machining program editing assist apparatus according to aspect 1, the removed shape, which is displayed on the shape display area, may be displayed together with orthogonal coordinate system symbols indicating a workpiece original point that is a basis of coordinate values defining the removed shape, and directions of X, Y, and Z axes.

When a user has misunderstood the position of the coordinate system that is the basis of coordinate values describing removed shape data constituting program data or the directions of the coordinate axes, or when a user erroneously has input setting data for the coordinate system, a removed shape displayed on the shape display area results in a shape different from his or her intended shape. When only the removed shape has been displayed, a user is able to instantly know that the displayed shape is different from his or her intended shape, but the user is unable to know the cause of the different shape because there is no suggestion about the cause. In such a case, an inexperienced user may be unable to correct the error when the user just changes coordinate value data without correcting its true cause. In the above device, the orthogonal coordinate system symbol expressing the position of the workpiece original point that is the basis of coordinate values defining the removed shape, and arrows indicating the directions of the X, Y, Z axes is displayed together with the removed shape. Thus, when a user has misunderstood the position of the coordinate system or the directions of the coordinate axes, or when a user has erroneously input setting data for the coordinate system, the user is able to easily notice such misunderstanding or erroneous data input.

Aspect 7: in the machining program editing assist apparatus according to aspect 6, coordinate value data included in program data and defining a removed shape may be displayed together with the removed shape, which is displayed on the shape display area.

When a user has erroneously input coordinate values of removed shape data defining a removed shape, a displayed removed shape results in a shape different from his or her intended shape. In the above device, coordinate value data is displayed together with the displayed removed shape, and thus, a user is able to easily know which coordinate value is incorrect among displayed coordinate values. Further, through a comparison of displayed coordinate values with a displayed shape, a user becomes able to predict what change of the shape is to be caused by which change of the coordinate values. Thus, this configuration facilitates not only user's correction of incorrect data, but also user's numerical value adjustment for eliminating a waste in machining.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A machine program editing assist apparatus for a machine tool, comprising:
   a memory to store a shape of a workpiece, a machine program, and to-be-removed shapes, the machine tool being configured to machine the workpiece to remove the to-be-removed shapes from the shape of the workpiece according to processes defined by the machine program, respectively;
   a display to display a product shape corresponding to the shape of the workpiece from which the to-be-removed shapes are removed;
   an operation circuit via which a first position in the product shape displayed on the display is input; and
   a control circuit configured to
      specify a first to-be-removed shape and a second to-be-removed shape of the to-be-removed shapes, the first to-be-removed shape and the second to-be-removed shape to be displayed so as to include the first position,
      control the display to display the first to-be-removed shape such that the first to-be-removed shape is visually differentiated from the product shape,
      determine whether a distance between the first position and a second position is equal to or smaller than a threshold distance if the second position on the display is input via the operation circuit while the first to-be-removed shape is displayed, and
      control the display to display the second to-be-removed shape such that the second to-be-removed shape is visually differentiated from the product shape if it is determined that the distance is equal to or smaller than the threshold distance.

2. The machine program editing assist apparatus according to claim 1, wherein the control circuit is configured to
   control the display to display the product shape, the first to-be-removed shape, and the second to-be-removed shape in a shape region, and
   control the display to display at least one of the processes in a program region different from the shape region.

3. The machine program editing assist apparatus according to claim 2, wherein the control circuit is configured to
   control the display to display a first process of the processes in the program region if the first to-be-removed shape is displayed in the shape region and if the first process corresponds to the first to-be removed shape, and
   control the display to display a second process of the processes in the program region if the second to-be-removed shape is displayed in the shape region and if the second process corresponds to the second to-be-removed shape.

4. The machine program editing assist apparatus according to claim 1, wherein the control circuit is configured to
   control the display to display the product shape, the first to-be-removed shape, and the second to-be-removed shape in a shape region, and
   control the display to display a process name of at least one of the processes in a process name region different from the shape region.

5. The machine program editing assist apparatus according to claim 4, wherein the control circuit is configured to
   control the display to display a first process name of a first process of the processes in the process name region if the first to-be-removed shape is displayed in the shape region and if the first process name and the first process correspond to the first to-be-removed shape, and
   control the display to display a second process name of a second process of the processes in the process name region if the second to-be-removed shape is displayed in the shape region and if the second process name and the second process correspond to the second to-be-removed shape.

6. The machine program editing assist apparatus according to claim 5, wherein the control circuit is configured to
   control the display to display at least one of the processes in a program region different from the shape region and the process name region,
   control the display to display the first process in the program region if the first to-be-removed shape is displayed in the shape region, and
   control the display to display the second process of the processes in the program region if the second to-be-removed shape is displayed in the shape region.

7. The machine program editing assist apparatus according to claim 1, wherein the control circuit is configured to
   specify a first process of the processes, the first process corresponding to the first to-be-removed shape,
   calculate a prior shape of the workpiece before manufacture according to the first process, and
   control the display to display the prior shape and the first to-be-removed shape such that the first to-be-removed shape is visually differentiated from the prior shape.

8. The machine program editing assist apparatus according to claim 2, wherein the control circuit is configured to
   calculate a changed shape changed from the first to-be-removed shape if a change operation is input via the operation circuit in order to change the at least one of the processes displayed in the program region, and
   control the display to display the changed shape in the shape region.

9. The machine program editing assist apparatus according to claim 1, wherein the control circuit is configured to control the display to display the product shape in a first color and the first to-be-removed shape in a second color different from the first color.

10. The machine program editing assist apparatus according to claim 2, wherein the control circuit is configured to
specify a selected process of the processes if a selecting operation is input via the operation circuit in order to select the selected process displayed in the program region,
specify a selected to-be-removed shape of the to-be-removed shapes, the selected to-be-removed shape corresponding to the selected process, and
control the display to display the selected to-be-removed shape in the shape region such that the selected to-be-removed shape is visually differentiated from the product shape.

11. The machine program editing assist apparatus according to claim 4, wherein the control circuit is configured to
specify a selected process name if a selecting operation is input in order to select the selected process name displayed in the process name region,
specify a selected to-be-removed shape of the to-be-removed shapes, the selected to-be-removed shape corresponding to the selected process name, and
control the display to display the selected to-be-removed shape in the shape region such that the selected to-be-removed shape is visually differentiated from the product shape.

12. The machine program editing assist apparatus according to claim 6, wherein the control circuit is configured to
specify a selected process name if a selecting operation is input via the operation circuit in order to select the selected process name displayed in the process name region,
specify a selected process corresponding to the selected process name, and
control the display to display the selected process in the program region.

13. The machine program editing assist apparatus according to claim 1, wherein the control circuit is configured to specify the first to-be-removed shape and the second to-be-removed shape such that the first to-be-removed shape is removed from the shape of the workpiece before the second to-be-removed shape is removed from the shape of the workpiece.

14. The machine program editing assist apparatus according to claim 1, wherein the control circuit is configured to
specify a third to-be-removed shape of the to-be-removed shapes, the third to-be-removed shape to be displayed so as to include the first position,
determine whether an additional distance between the first position and a third position is equal to or smaller than the threshold distance if the third position on the display is input while the second to-be-removed shape is displayed, and
control the display to display the third to-be-removed shape such that the third to-be-removed shape is visually differentiated from the product shape if it is determined that the additional distance is equal to or smaller than the threshold distance.

15. A machine program editing assist apparatus for a machining tool, comprising:
a memory to store a machine program, a path, and to-be-removed shapes, a tool of the machine tool being configured to move along the path to remove the to-be-removed shapes from a shape of a workpiece according to processes defined by the machine program, respectively;
a display to display the to-be-removed shapes and the path such that the to-be-removed shapes are visually differentiated from the path;
an operation circuit via which a first position on the display is input; and
a control circuit configured to
specify a first portion and a second portion of the path, a first distance between the first portion and the first position on the display being equal to or smaller than a first threshold distance, a second distance between the second portion and the first position on the display being equal to or smaller than the first threshold distance,
specify a first to-be-removed shape and a second to-be-removed shape of the to-be-removed shapes, the first to-be-removed shape corresponding to the first portion, the second to-be-removed shape corresponding to the second portion,
control the display to display the first portion and the first to-be-removed shape such that the first to-be-removed shape is visually differentiated from the path,
determine whether a third distance between the first position and a second position is equal to or smaller than a second threshold distance if the second position on the display is input via the operation circuit while the first to-be-removed shape is displayed, and
control the display to display the second portion and the second to-be-removed shape such that the second to-be-removed shape is visually differentiated from the path if it is determined that the third distance is equal to or smaller than the second threshold distance.

* * * * *